(12) United States Patent
Wang et al.

(10) Patent No.: US 9,238,724 B2
(45) Date of Patent: Jan. 19, 2016

(54) ELASTOMER COMPOSITE AND METHOD FOR PRODUCING IT

(71) Applicant: Cabot Corporation, Boston, MA (US)

(72) Inventors: Meng-Jiao Wang, Shanghai (CN); Ting Wang, Lexington, MA (US); Michael D. Morris, Nashua, NH (US); Xuan Zhang, Acton, MA (US); Martin C. Green, Boxborough, MA (US); Vijay R. Tirumala, Waltham, MA (US)

(73) Assignee: Cabot Corporation, Boston, MA (US)

( * ) Notice: Subject to any disclaimer, the term of this patent is extended or adjusted under 35 U.S.C. 154(b) by 144 days.

(21) Appl. No.: 14/056,449

(22) Filed: Oct. 17, 2013

(65) Prior Publication Data

US 2014/0045989 A1    Feb. 13, 2014

Related U.S. Application Data

(63) Continuation of application No. 12/866,323, filed as application No. PCT/US2009/000732 on Feb. 5, 2009, now Pat. No. 8,586,651.

(60) Provisional application No. 61/065,086, filed on Feb. 8, 2008.

(51) Int. Cl.
| | |
|---|---|
| *C08C 1/14* | (2006.01) |
| *C08K 3/04* | (2006.01) |
| *C08C 1/15* | (2006.01) |
| *C08J 3/16* | (2006.01) |
| *C08J 3/215* | (2006.01) |
| *C08J 3/22* | (2006.01) |

(52) U.S. Cl.
CPC ... *C08K 3/04* (2013.01); *C08C 1/15* (2013.01); *C08J 3/16* (2013.01); *C08J 3/215* (2013.01); *C08J 3/226* (2013.01); *C08J 2307/02* (2013.01); *C08J 2321/02* (2013.01); *C08J 2407/02* (2013.01); *C08J 2423/00* (2013.01)

(58) Field of Classification Search
CPC .................................................... C08K 3/04
USPC ........................................ 524/575.5; 523/352
See application file for complete search history.

(56) References Cited

U.S. PATENT DOCUMENTS

| | | | |
|---|---|---|---|
| 2,854,426 | A | 9/1958 | Dasher |
| 3,048,559 | A | 8/1962 | Heller at al. |
| 3,294,720 | A | 12/1966 | Beber et al. |
| 3,335,200 | A | 8/1967 | Thorn |
| 3,403,121 | A | 9/1968 | Hare |
| 4,029,633 | A | 6/1977 | Hagopian et al. |
| 5,763,388 | A | 6/1998 | Lightsey et al. |
| 5,877,251 | A * | 3/1999 | Sant ............... 524/496 |
| 6,048,923 | A | 4/2000 | Mabry et al. |
| 6,075,084 | A | 6/2000 | Mabry et al. |
| 6,291,572 | B1 | 9/2001 | Brown et al. |
| 6,365,663 | B2 | 4/2002 | Mabry et al. |
| 6,372,822 | B1 | 4/2002 | Chung et al. |
| 6,403,696 | B1 | 6/2002 | Barber et al. |
| 6,646,028 | B2 | 11/2003 | Lopez-Serrano Ramos et al. |
| 6,841,606 | B2 | 1/2005 | Yanagisawa et al. |
| 6,908,961 | B2 | 6/2005 | Wang et al. |
| 6,929,783 | B2 | 8/2005 | Chung et al. |
| 7,101,922 | B2 | 9/2006 | Chen et al. |
| 7,105,595 | B2 | 9/2006 | Mabry et al. |
| 7,348,375 | B2 | 3/2008 | Wang et al. |
| 7,582,688 | B2 | 9/2009 | Mabry et al. |
| 7,582,689 | B2 | 9/2009 | Chung et al. |
| 8,586,651 | B2 * | 11/2013 | Wang et al. ............... 523/352 |
| 2003/0013797 | A1 | 1/2003 | Thielen et al. |
| 2003/0125446 | A1 | 7/2003 | Wang et al. |
| 2008/0214700 | A1 | 9/2008 | Yamada et al. |
| 2010/0144951 | A1 | 6/2010 | Yamada et al. |
| 2012/0172492 | A1 | 7/2012 | Wang et al. |
| 2012/0172517 | A1 * | 7/2012 | Zhang et al. ............... 524/526 |

FOREIGN PATENT DOCUMENTS

| | | | |
|---|---|---|---|
| EP | 1834985 | A1 | 9/2007 |
| EP | 1857493 | A1 | 11/2007 |

(Continued)

OTHER PUBLICATIONS

International Preliminary Report on Patentability of International Patent Application No. PCT/US2009/000732, mailed from WIPO on Aug. 19, 2010.
Bhatia, S.R., "Ultra-small-angle scattering studies of complex fluids," Current Opinion in Colloid and Interface Science, 2005, pp. 404-411, vol. 9.
Higgins, J., et al., "Polymers and Neutron Scattering," 1998, Clarendon Press, pp. 52 and 125.
Kline, S.R., "Reduction and Analysis of SANS and USANS Data Using IGOR Pro," J. Appl. Cryst., 2006, pp. 895-900, vol. 39.
Koga, T. et al., "New Insights into Hierarchical Structures of Carbon Black Dispersed in Polymer Matrices: A Combined Small-Angle Scattering Study," Macromolecules, 2008, pp. 453-464, vol. 41.

(Continued)

*Primary Examiner* — Hannah Pak

(57) ABSTRACT

A method of producing an elastomer composite. The method includes A) combining a first fluid comprising elastomer latex with a second fluid comprising particulate filler; B) causing the elastomer latex to coagulate, thereby forming masterbatch crumb; C) bringing the masterbatch crumb to a water content of about 1 weight percent to about 20 weight percent, thereby forming a de-watered coagulum; D) removing water from the de-watered coagulum by subjecting the dewatered coagulum to mechanical energy, thereby causing the dewatered coagulum to heat as a result of friction, while allowing the dewatered coagulum to achieve a temperature of about 130° C. to about 190° C., wherein water content is reduced to about 0.5% to about 3% and wherein substantially all of the decrease in water content is accomplished by evaporation, thereby producing a masticated masterbatch; and E) subjecting the masticated masterbatch to at least an additional 0.3 MJ/kg of mechanical energy while further reducing the water content.

7 Claims, 6 Drawing Sheets

(56) References Cited

FOREIGN PATENT DOCUMENTS

| | | |
|---|---|---|
| GB | 957607 | 5/1964 |
| GB | 1421011 | 1/1976 |
| JP | 2006265311 | 10/2006 |
| RU | 2223980 | 2/2004 |
| WO | 96/18688 A1 | 6/1996 |
| WO | 00/62990 A1 | 10/2000 |
| WO | 2006/068078 A1 | 6/2006 |
| WO | 2006/080852 A1 | 8/2006 |
| WO | 2006/082852 A1 | 8/2006 |

OTHER PUBLICATIONS

Medalia, A.I., "Electrical Conduction in Carbon Black Composites," Rubber Chemistry and Technology, 1986, pp. 432, vol. 59.

Schaefer, D.W., et al., "Ultra-small-angle neutron scattering: a new tool for materials research," Current Opinion in Solid State and Materials Science, 2004, pp. 39-47, vol. 8.

Wang, M., et al., "Filler-Elastomer Interactions. Part VIII. The Role of the Distance Between Filler Aggregates in the Dynamic Properties of Filled Vulcanizates," Rubber Chemistry and Technology, 1993, pp. 178, vol. 66.

Wang, M., et al., "NR/Carbon Black Masterbatch Produced with Continuous Liquid Phase Mixing," KGK Kauschuk Gummi Kunststoffe, 2002, pp. 388-396, vol. 7-8.

Wignall, G.D. et al., "Recent applications of small-angle neutron scattering in strongly interacting soft condensed matter," Reports on Progress in Physics, 2005, pp. 1761-1810, vol. 68.

Wolff, S., et al., "Filler-Elastomer Interactions. Part IV. The Effect of the Surface Energies of Fillers on Elastomer Reinforcement" Rubber Chemistry and Technology, 1992, pp. 329, vol. 65.

International Search Report, mailed Jun. 4, 2009, from PCT/US2009/000732, filed Feb. 5, 2009.

\* cited by examiner

ELASTOMER COMPOSITE AND METHOD FOR PRODUCING IT

RELATED APPLICATIONS

This application is a continuation application of U.S. application Ser. No. 12/866,323, filed on Aug. 5, 2010, which is a national phase application under 35 U.S.C. §371 of International Application Number PCT/US2009/000732, filed on Feb. 5, 2009, which claims priority to U.S. Provisional Patent Application No. 61/065,086, filed on Feb. 8, 2008. The disclosure of U.S. Provisional Patent Application No. 61/065,086 is incorporated herein by reference.

BACKGROUND OF THE INVENTION

1. Field of the Invention

The present invention relates to methods for producing elastomer composites and composites produced by such methods.

2. Description of the Related Art

Numerous products of commercial significance are formed of elastomeric compositions wherein particulate filler is dispersed in any of various synthetic elastomers, natural rubber or elastomer blends. Carbon black, for example, is widely used as a reinforcing agent in natural rubber and other elastomers. It is common to produce a masterbatch, that is, a premixture of filler, elastomer and various optional additives, such as extender oil. Carbon black masterbatch is prepared with different grades of commercially available carbon black which vary both in surface area per unit weight and in structure, which describes the size and complexity of aggregates of carbon black formed by the fusion of primary carbon black particles to one another. Numerous products of commercial significance are formed of such elastomeric compositions of carbon black particulate filler dispersed in natural rubber. Such products include, for example, vehicle tires wherein different elastomeric compositions may be used for the tread portion, sidewalls, wire skim and carcass. Other products include, for example, engine mount bushings, conveyor belts, windshield wipers and the like.

Good dispersion of carbon black in natural rubber compounds has been recognized for some time as one of the most important objectives for achieving good quality and consistent product performance, and considerable effort has been devoted to the development of procedures for assessing dispersion quality in rubber. The mixing operations have a direct impact on mixing efficiency and on macro-dispersion. In general, better carbon black macro-dispersion is achieved in a dry-mixed masterbatch by longer mixing and by more intensive mixing. Unfortunately, however, achieving better macro-dispersion by longer, more intensive mixing degrades the elastomer into which the carbon black is being dispersed. This is especially problematic in the case of natural rubber, which is highly susceptible to mechanical/thermal degradation. Longer and more intensive mixing, using known mixing techniques and apparatus, such as an internal mixer, reduces the molecular weight of the natural rubber masterbatch-composition. Thus, improved macro-dispersion of carbon black in natural rubber is known to be achieved with a corresponding, generally undesirable reduction in the molecular weight of the rubber.

In addition to dry mixing techniques, it is known to continuously feed latex and a carbon black slurry to an agitated coagulation tank. Such "wet" techniques are often used with synthetic elastomer, such as styrene butadiene rubber (SBR). The coagulation tank contains a coagulant such as salt or an aqueous acid solution typically having a pH of about 2.5 to 4. The latex and carbon black slurry are mixed and coagulated in the coagulation tank into small beads (typically a few millimeters in diameter) referred to as wet crumb. The crumb and acid effluent are separated, typically by means of a vibrating shaker screen or the like. The crumb is then dumped into a second agitated tank where it is washed to achieve a neutral or near neutral pH. Thereafter the crumb is subjected to additional vibrating screen and drying steps and the like. Variations on this method have been suggested for the coagulation of natural and synthetic elastomers. In commonly owned U.S. Pat. No. 4,029,633 to Hagopian et al., a continuous process for the preparation of elastomer masterbatch is described. An aqueous slurry of carbon black is prepared and mixed with a natural or synthetic elastomer latex. This mixture undergoes a so-called creaming operation, optionally using any of various known creaming agents. Following the creaming of the carbon black/latex mixture, it is subjected to a coagulation step. Specifically, the creamed carbon black/latex mixture is introduced as a single coherent stream into the core of a stream of coagulating liquor. The solid stream of creamed carbon black/latex mixture is said to undergo shearing and atomizing by the stream of coagulating liquor prior to coagulation, being then passed to a suitable reaction zone for completion of the coagulation. Following the coagulation step, the crumb is separated from the waste product "serum," washed, and dried. A somewhat similar process is described in U.S. Pat. No. 3,048,559 to Heller, et al. An aqueous slurry of carbon black is continuously blended with a stream of natural or synthetic elastomer or latex. The two streams are mixed under conditions described as involving violent hydraulic turbulence and impact. As in the case of the Hagopian patent mentioned above, the combined stream of carbon black slurry and elastomer latex is subsequently coagulated by the addition of an acid or salt coagulant solution.

It is well known that mastication of dry masterbatch (e.g., produced by a dry mix process or by a wet masterbatch process, followed by drying) may be employed to reduce Mooney viscosity and improve processability while incorporating additives such as oils, antioxidants, and zinc oxide. Vulcanizing agents may be added as well or may be added in a second mastication step. However, the mixing may need to be done at lower temperatures (e.g., below 125° C.) to prevent precure or scorch. In addition, overmixing may be detrimental to viscoelastic properties and may increase flocculation during storage, which can increase storage hardening and further degrade rubber performance (Wang, et al., *KGK Kauschuk Gummi Kunststoffe*, Vol. 7-8, 2002, pp. 388-396).

An alternative mixing method is disclosed by commonly owned U.S. Pat. Nos. 6,048,923 and 6,929,783, which disclose a wet masterbatch process in which separate streams of a carbon black slurry and an elastomer latex are combined under conditions where the elastomer latex coagulates without the use of added coagulants. The masterbatch is dewatered to about 15% to 25% water content and then passed through a continuous compounder and, optionally, an open mill. The final product has a moisture content of less than about 1% and may have a temperature of about 100° C. after emerging from the open mill. The operating parameters of the continuous compounder, e.g., throughput rate, rotor speed, discharge orifice size and temperature, and processing chamber temperature, may be optimized to control Mooney viscosity, moisture content, molecular weight, and bound rubber. The desired values of these properties depend on the intended use of the product masterbatch. For example, the Mooney viscosity may be reduced to facilitate further processing of the masterbatch into vulcanized rubber.

U.S. Pat. No. 6,841,606 ("the '606 patent") describes a wet masterbatch process and suggests drying the coagulum by applying a mechanical shearing force to improve the dispersion of the filler. The resulting rubber is disclosed to have good processability and reinforcement and reduce fuel consumption. In the examples, a latex masterbatch having about 50 phr of carbon black or silica was brought to about 40% moisture content and dried thermally at 120° C. or through use of a 1 meter long twin-screw kneading extruder maintained at the same temperature. Use of the drier and the extruder resulted in products having approximately equivalent tensile strength and abrasion resistance.

PCT Publication WO 2006/068078 discloses a method of making wet natural rubber masterbatch having particular grades of carbon black defined by nitrogen surface area, 24M4 DBP, and particle size distribution. As in the '606 patent, the examples describe the production of masterbatch having 50 phr of carbon black, dehydrated to about 40% moisture content, and passed through a 1 meter long twin-screw kneading extruder maintained at 120° C.

PCT Publication WO 2006/080852 discloses a wet natural rubber masterbatch including a carbon black having specific surface area, structure, and tint. As in the '606 patent, the examples describe the production of masterbatch having 50 phr of carbon black, dehydrated to about 40% moisture content, and passed through a 1 meter long twin-screw kneading extruder maintained at 120° C.

Japanese Patent Publication No. 2006-265311 discloses a wire skim composition produced using a wet rubber masterbatch having a carbon black with specific surface area or structure. As in the '606 patent, the examples describe the production of masterbatch having 50 phr of carbon black, dehydrated to about 40% moisture content, and passed through a 1 meter long twin-screw kneading extruder maintained at 120° C.

However, as carbon black loading increases, it is difficult to achieve good dispersion of the carbon black at either macroscopic (e.g., 10 micron or greater) or microscopic levels and the quality of the masterbatch at a macroscopic level, with the consequence that the resulting rubber does not exhibit desired properties. Furthermore, masterbatches produced with carbon blacks having higher structure and surface area values are more viscous, making them more difficult to compound.

SUMMARY OF THE INVENTION

In response to the problem of the difficulty of control of dispersion and masterbatch quality, we have discovered that controlled input of mechanical energy into the masterbatch with respect to a drying profile as water is removed allows manufacture of a product exhibiting a consistent microstructure and reproducible material properties. Mechanical energy input also reduces the viscosity of masterbatches having higher loadings of high surface area, high structure carbon blacks, making easier to compound these masterbatches into vulcanized rubber products.

In one aspect, the invention is a method of producing an elastomer composite. The method includes A) combining a first fluid comprising elastomer latex with a second fluid comprising particulate filler; B) causing the elastomer latex to coagulate, thereby forming masterbatch crumb; C) bringing the masterbatch crumb to a water content of about 1 weight percent to about 20 weight percent, thereby forming a dewatered coagulum; D) removing water from the dewatered coagulum by subjecting the dewatered coagulum to mechanical energy, thereby causing the dewatered coagulum to heat as a result of friction, while allowing the dewatered coagulum to achieve a temperature of about 130° C. to about 190° C., wherein water content is further reduced to about 0.5% to about 3% and wherein substantially all of the decrease in water content is accomplished by evaporation, thereby producing a masticated masterbatch; and E) subjecting the masticated masterbatch to at least an additional 0.3 MJ/kg of mechanical energy while further reducing the water content.

For example, D) may include subjecting the dewatered coagulum to at least about 0.9 MJ/kg of mechanical energy, and/or E may include subjecting the masticated masterbatch to at least 0.7 MJ/kg of mechanical energy. The dewatered coagulum may achieve a temperature of about 140° C. to about 160° C. during D). Alternatively or in addition, C) may include bringing the water content of the masterbatch crumb to about 10 weight percent to about 20 weight percent. One or both of D) and E) may independently include processing the dewatered coagulum in at least one apparatus selected from a continuous mixer, an internal mixer, a twin screw extruder, a single screw extruder, and a roll mill, and one or both of D) and E) may include processing the dewatered coagulum in the at least one apparatus at least twice.

In another aspect, the invention is an elastomer composite. The elastomer composite is formed by a method including A) combining a first fluid comprising elastomer latex with a second fluid comprising particulate filler; B) causing the elastomer latex to coagulate, thereby forming masterbatch crumb; C) bringing the masterbatch crumb to a water content of about 1 weight percent to about 20 weight percent, thereby forming a dewatered coagulum; D) removing water from the dewatered coagulum by subjecting the dewatered coagulum to mechanical energy, thereby causing the dewatered coagulum to heat as a result of friction, while allowing the dewatered coagulum to achieve a temperature of about 130° C. to about 190° C., wherein water content is reduced to about 0.5% to about 3% and wherein substantially all of the decrease in water content is accomplished by evaporation, thereby producing a masticated masterbatch; and E) subjecting the masticated masterbatch to at least an additional 0.3 MJ/kg of mechanical energy while further reducing the water content.

In another aspect, the invention is a method of producing an elastomer composite. The method includes A) feeding a continuous flow of first fluid comprising elastomer latex to a mixing zone of a coagulum reactor; B) feeding a continuous flow of second fluid comprising particulate filler under pressure to the mixing zone of the coagulum reactor to form a mixture with the elastomer latex, the particulate filler being effective to coagulate the elastomer latex and the feeding of the first fluid and the second fluid within the mixing zone being sufficiently energetic to substantially completely coagulate the elastomer latex with the particulate filler in the coagulum reactor to form a masterbatch crumb; C) discharging a substantially continuous flow of masterbatch crumb from the coagulum reactor; D) bringing the water content of the masterbatch crumb to about 1 weight percent to about 20 weight percent, thereby forming a dewatered coagulum; E) removing water from the dewatered coagulum by subjecting the dewatered coagulum to mechanical energy, thereby causing the dewatered coagulum to heat as a result of friction, while allowing the dewatered coagulum to achieve a temperature of about 130° C. to about 190° C., wherein water content is reduced to about 0.5% to about 3% and wherein substantially all of the decrease in water content is accomplished by evaporation, thereby producing a masticated masterbatch;

and F) subjecting the masticated masterbatch to at least an additional 0.3 MJ/kg of mechanical energy while further reducing the water content.

In some embodiments, E) may include subjecting the dewatered coagulum to at least about 0.9 MJ/kg of mechanical energy, and/or F) may include subjecting the masticated masterbatch to at least 0.7 MJ/kg of mechanical energy. The dewatered coagulum may achieve a temperature of about 140° C. and about 160° C. during E). Alternatively or in addition, D) may include bringing the water content of the masterbatch crumb to about 10 to about 20 weight percent. One or both of E) and F) may independently include processing the dewatered coagulum in at least one apparatus selected from a continuous mixer, an internal mixer, a twin screw extruder, a single screw extruder, and a roll mill. One or both of E) and F) may include processing the dewatered coagulum in the at least one apparatus at least twice.

In another aspect, the invention is an elastomer composite. The elastomer composite is produced by a method including A) feeding a continuous flow of first fluid comprising elastomer latex to a mixing zone of a coagulum reactor; B) feeding a continuous flow of second fluid comprising particulate filler under pressure to the mixing zone of the coagulum reactor to form a mixture with the elastomer latex, the particulate filler being effective to coagulate the elastomer latex and the feeding of the first fluid and the second fluid within the mixing zone being sufficiently energetic to substantially completely coagulate the elastomer latex with the particulate filler in the coagulum reactor; to form a masterbatch crumb; C) discharging a substantially continuous flow of masterbatch crumb from the coagulum reactor; D) bringing the water content of the masterbatch crumb to about 1 weight percent to about 20 weight percent, thereby forming a dewatered coagulum; E) removing water from the dewatered coagulum by subjecting the dewatered coagulum to mechanical energy, thereby causing the dewatered coagulum to heat as a result of friction, while allowing the dewatered coagulum to achieve a temperature of about 130° C. to about 190° C., wherein water content is reduced to about 0.5% to about 3% and wherein substantially all of the decrease in water content is accomplished by evaporation, thereby producing a masticated masterbatch; and F) subjecting the masticated masterbatch to at least an additional 0.3 MJ/kg of mechanical energy while further reducing the water content.

In another aspect, the invention is a vulcanized wet mix elastomer composite. The vulcanized wet mix elastomer composite includes at least one carbon black having a CDBP value of at least about 65 mL/100 g, for example, between about 70 and about 110 mL/100 g, between about 75 and about 85 mL/100 g, between about 85 and about 90 mL/100 g, between about 90 and about 95 mL/100 g, between about 95 and about 100 mL/100 g, between about 100 and about 105 mL/100 g, or between about 105 and about 110 mL/100 g. The vulcanized wet mix elastomer composite exhibits a ratio of T300 to T100 that is greater than 10% higher, for example, at least about 15% higher, at least about 13% higher, at least about 17% higher, or at least about 20% higher, than the same ratio for a vulcanized dry mix elastomer composite having the same composition.

In another aspect, the invention is a method of producing an elastomer composite. The method includes A) combining a first fluid comprising elastomer latex with a second fluid comprising particulate filler; B) causing the elastomer latex to coagulate, thereby forming masterbatch crumb; C) bringing the water content of the masterbatch crumb to from about 3 weight percent to about 6 weight percent, thereby forming a dewatered coagulum; D) removing water from the dewatered coagulum by subjecting the dewatered coagulum to mechanical energy, thereby causing the dewatered coagulum to heat as a result of friction, while allowing the dewatered coagulum to achieve a temperature from about 140° C. to about 190° C., wherein substantially all of the decrease in water content is accomplished by evaporation, thereby producing a masticated masterbatch; and E) subjecting the masticated masterbatch to at least an additional 0.3 MJ/kg of mechanical energy while further reducing the water content. A dewatering extruder may be used to accomplish C) and D). The moisture content of the masticated masterbatch may be from about 1% to about 3%. Step D) may include employing an internal mixer to masticate the dewatered coagulum. Step E) may include using an open mill to masticate the masticated masterbatch.

In another aspect, the invention is a vulcanized elastomer composite including particulate filler dispersed in elastomer. The particulate filler includes at least about 40 phr, for example, at least about 42 phr, at least about 45 phr, or at least about 50 phr of at least one carbon black. The elastomer composite may include at most about 55 phr, at most about 60 phr, or at most about 65 phr of the at least one carbon black. The at least one carbon black may have an STSA value from about 165 m$^2$/g to about 205 m$^2$/g, for example from about 165 m$^2$/g to about 180 m$^2$/g, from about 170 m$^2$/g to about 175 m$^2$/g, from about 180 m$^2$/g to about 200 m$^2$/g, from about 185 m$^2$/g to about 195 m$^2$/g, or from about 190 m$^2$/g to about 200 m$^2$/g. Alternatively or in addition, the at least one carbon black may have a CDBP value from about 85 mL/100 g to about 110 mL/100 g, for example, from about 90 to about 105 mL/100 g, from about 95 to about 100 mL/100 g, or from about 100 mL/100 g to about 110 mL/100 g. The vulcanized elastomer composite exhibits a ratio of T300 to T100 of at least about 5.5, for example, at least about 6 or at least about 6.5. For example, the at least one carbon black may have a CDBP value from about 95 mL/100 g to about 105 mL/100 g and an STSA value from about 165 to about 180 m$^2$/g, and the ratio of T300 to T100 may be at least about 6. In another example, the particulate filler may include at least about 45 phr of the at least one carbon black, and the at least one carbon black may have a CDBP value from about 85 mL/100 g to about 95 mL/100 g and an STSA value from about 190 to about 205 m$^2$/g. The vulcanized elastomer composite may be a wet mix elastomer composite.

In another aspect, the invention is a wet mix elastomer composite consisting essentially of carbon black dispersed in natural rubber. When the wet mix elastomer composite is processed according to CTV Method A, the resulting vulcanized wet mix elastomer composite exhibits a resistivity having a natural logarithm that is at least about 10% higher, for example, at least about 15% higher, than the same property for a vulcanized dry mix elastomer composite having the same composition and prepared using CTV Comparative Method A.

In another aspect, the invention is an elastomer composite including carbon black dispersed in natural rubber. When the elastomer composite is processed using CTV Method A, it exhibits a resistivity satisfying the equation ln(resistivity)≥0.33δ+X, where X is 5.8 and $$\delta = (6000[0.806\phi^{-1/3}\beta^{-1/3} - 1]\beta^{1.43})/\rho S$$

where:
$\phi$=volume fraction of carbon black in the composite,
S=specific surface area of the carbon black in m$^2$/g measured by the nitrogen BET method, $\rho$=carbon black density,
$\beta = \phi_{eff}/\phi$, and
$\phi_{eff} = \phi[1+(0.0181*CDBP)]/1.59$.

In an alternative embodiment, X is 6.2. Alternatively or in addition, the resistivity also satisfies ln(resistivity)≤0.33δ+Y, wherein Y is 9.5.

In another aspect, the invention is an elastomer composite including carbon black dispersed in natural rubber. When the elastomer composite is processed using CTV Method B, it exhibits a Neutron Scattering Power Value less than about 0.5, for example, less than about 0 or less than about −0.25.

Unless otherwise specified, all material proportions described as a percent herein are in weight percent.

It is to be understood that both the foregoing general description and the following detailed description are exemplary and explanatory only and are intended to provide further explanation of the present invention, as claimed.

BRIEF DESCRIPTION OF THE DRAWINGS

The invention is described with reference to the several figures of the drawing, in which.

DETAILED DESCRIPTION OF THE INVENTION

Figure 1:
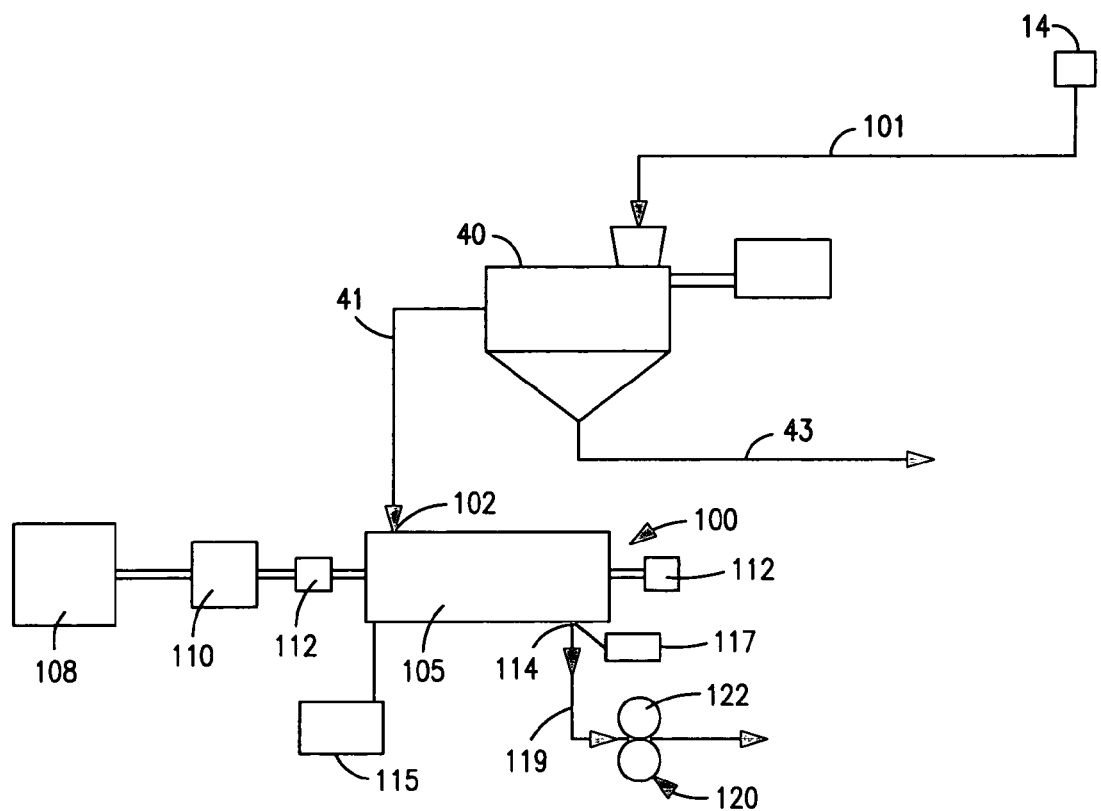
FIG. 1 is a schematic flow chart illustration of an apparatus and method for preparing elastomer masterbatch in accordance with exemplary embodiments of the present invention.

In certain embodiments, an elastomer composite is produced by exploiting a wet masterbatch process to make masterbatch crumb, which is brought to a water content of about 1% to about 20%. The resulting dewatered coagulum is subjected to mechanical energy, thereby causing the dewatered coagulum to heat as a result of friction, while allowing the dewatered coagulum to achieve a temperature of about 130° C. to about 190° C., thereby reducing the water content to about 0.5% to about 3%. Substantially all of the decrease in water content is accomplished by evaporation. The resulting masticated masterbatch is subjected to at least an additional 0.3 MJ/kg of mechanical energy while the water content is further reduced.

The method and apparatus disclosed and described here produce elastomer composites having excellent physical properties and performance characteristics. Notably, elastomer masterbatch having excellent physical properties and performance characteristics can be produced using natural rubber latex (e.g., latex concentrate, field latex, skim latex, or mixtures of two or more of these in any proportion) along with various grades of carbon black filler. Carbon blacks presently in broad commercial use for rubber and other composite applications may benefit from various embodiments of the invention, as well as carbon blacks not previously commonly used in commercial and industrial rubber applications. According to certain embodiments of the present invention, carbon blacks with high surface area and/or structure levels may be better dispersed at higher loading levels to produce rubber having superior performance properties when compared to rubbers produced with less or no mechanical mastication, or different correlations of mechanical energy input and water removal. In addition, certain embodiments of the present invention may be used to produce masterbatches having high loadings of carbon blacks having high surface area and high levels of structure and exhibiting improved processability during compounding. Vulcanized elastomer composites produced using masterbatch according to the invention exhibit improved performance with respect both to dry mixed compositions and to wet masterbatch compositions that have not been so masticated.

Elastomer composites produced according to the various embodiments of the invention may be compounded with any vulcanization package known to those of skill in the art, for example, cure packages based on sulfur- or peroxide-containing materials, and vulcanized to produce rubbers for use in tires, tracks and track pads for track-propelled equipment such as bulldozers, etc., mining equipment such as screens, mining equipment linings, conveyor belts, chute liners, slurry pump liners, mud pump components such as impellers, valve seats, valve bodies, piston hubs, piston rods, and plungers, impellers for various applications such as mixing slurries and slurry pump impellers, grinding mill liners, cyclones and hydrocyclones, and expansion joints, marine equipment such as linings for pumps (e.g., outboard motor pumps, dredge pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other applications where abrasion resistance is desired. Various types of parts such as rollers, cams, shafts, and pipes may also benefit from the use of certain embodiments of the invention, as may applications in which rubber is bonded to metal components, such as tread bushings for vehicles.

In certain embodiments, coordinating the rate of water removal from wet masterbatch with respect to the amount of mechanical energy input improves the interaction of the elastomer and the filler. Mastication is provided under conditions that will create friction between the elastomer and the filler but is carefully controlled to avoid damaging the elastomer phase. Nonetheless, higher levels of energy than had been previously thought advisable may be imparted to the rubber without impairing performance. In certain embodiments, elastomer composites are prepared with a filler loading of at least about 40 phr, at least about 50 phr, at least about 55 phr, at least about 60 phr, at least about 65 phr, or at least about 70 phr of carbon black, for example, from about 40 to about 70 phr, from about 50 to about 75 phr, from about 55 to about 80 phr, from 60 to about 85 phr, from 65 to about 90 phr, from 70 to about 90 phr, from 40 to about 60 phr, between 50 and about 65 phr, from 55 to about 80 phr, from about 60 to about 90 phr, from about 65 to about 80 phr, or from about 70 to about 80 phr.

As used here, the carbon black structure can be measured as the dibutyl phthalate adsorption (DBPA) value for the crushed carbon black (CDBP), expressed as milliliters of DBPA per 100 grams crushed carbon black, according to the procedure set forth in ASTM D3493. The carbon black surface area can be measured using the statistical thickness method (STSA), expressed as square meters per gram of carbon black, according to the procedure set forth in ASTM D6556.

Without wishing to be bound by any particular theory, it is thought that mechanically working the masterbatch while removing water enhances the interaction of the filler and the polymer, and that it is the improvement of this interaction that improves the performance of the final product with respect to both dry mixed rubbers having the same composition and rubbers produced by a wet masterbatch process that have been thermally dried. Furthermore, we have observed favorable results from increasing the amount of mechanical energy imparted to the material as water is removed even where the amount of mechanical work would have been expected to be detrimental to the properties of the final rubber product. Improvements have been observed in both the mechanical properties and the microstructure of the final rubber product.

Characterization of Particle Distribution in Filled Vulcanizates

Improvements in rubber reinforcement are reflected in the ratio of the stresses at different elongations. For carbon black-filled vulcanizates, stresses at given elongations reflect, among other things, the effect of filler morphology (particle size and structure) and surface activity, which determines filler-polymer and aggregate-aggregate interaction. The ratio of the stress at 300% elongation to that at 100% elongation, $T_{300}/T_{100}$, provides a useful approach for quantifying the degree of polymer-filler interaction because the factors governing the stresses at different elongations are different. Structure affects the occlusion of rubber in the filler aggregates. Increased occlusion increases the effective filler volume fraction, a description of the extent to which filler actually interacts with the rubber matrix and influences the properties of the rubber matrix composite, and thus the stresses at given elongations for the filled vulcanizate. For two compounds filled with same carbon black, the effects of structure and surface area on stress should be the same. As a result, any difference in stresses at different strains can be attributed to the crosslinking density of the polymer matrix, polymer-filler interaction, and aggregate-aggregate interaction, the last of which leads to filler agglomeration. At low strain, the agglomerates are not broken down, and the rubber trapped in the agglomerates can be treated as filler. This increases the effective volume of the fillers, thus increasing the stress at a given elongation. The filler agglomerates gradually break with increasing strain so that the effect of filler agglomeration on stress at given elongation will decrease and finally disappear at about 100% elongation. On the other hand, at higher elongation, e.g., at 300% elongation, a different mechanism is involved. In the absence of interaggregate association, the interaction between the polymer and filler has a greater influence on the stress. Where the interaction between the polymer and the filler is weak, high strain leads to slippage and deattachment (dewetting) of rubber molecules on the black surface, reducing stress for a given strain. The effect of cross-link density on stress is the about the same at both 100% and 300% strain. As a result, the ratio $T_{300}/T_{100}$ provides a measure of the in-rubber polymer-filler interaction (S. Wolff and M.-J. Wang, *Rubber Chem. Technol.*, 65, 329 (1992)).

In certain embodiments, a vulcanized wet mix elastomer composite includes at least one carbon black having a CDBP value of at least about 65 mL/100 g, for example, between about 70 and about 110 mL/100 g, between about 75 and about 85 mL/100 g, between about 85 and about 90 mL/100 g, between about 90 and about 95 mL/100 g, between about 95 and about 100 mL/100 g, between about 100 and about 105 mL/100 g, or between about 105 and about 110 mL/100 g. The vulcanized elastomer composite exhibits a ratio of T300 to T100 that is greater than 10% higher, for example, at least about 13% higher, at least about 15% higher, at least about 17% higher, or at least about 20% higher, e.g., from about 13% to about 25% higher or from about 17% to about 30% higher than the same ratio for a vulcanized dry mix elastomer composite having the same composition. The vulcanized wet mix elastomer may include at least about 40 phr, at least about 45 phr, at least about 50 phr, at least about 55 phr, at least about 60 phr, or at least about 65 phr of the carbon black. For example, the vulcanized wet mix elastomer may include from about 40 phr to about 80 phr, from about 45 phr to about 70 phr, or from about 50 phr to about 90 phr of the carbon black. As used herein, the term "wet mix elastomer composite" refers to an elastomer composite which has been prepared by a wet masterbatch process. In contrast, the term "dry mix elastomer composite" refers to an elastomer composite which has been prepared by combining dry elastomer (e.g., less than 1% water) and particulate filler in powder form.

We have also found that improvements to the filled rubber are reflected in the microstructure of the composite. As described in U.S. Pat. No. 6,048,923, rubber composites produced by the method disclosed therein exhibit improved macrodispersion of filler with respect to dry mixed rubbers. Macrodispersion describes the dispersion of filler within a composite at length scales of 10 microns or greater. Without being bound by any particular theory, it is believed that good macrodispersion results from the breakup of filler pellets and the uniform distribution of the resulting material within the elastomer matrix. We have unexpectedly found that improvements in the distribution of filler with respect to shorter length scales are correlated with improvements in the mechanical properties of the bulk product. This feature of the composite microstructure is termed microdispersion. Without being bound by any particular theory, it is believed that improvements in microdispersion result from better separation of individual filler aggregates and/or small clusters of aggregates (i.e., agglomerates) within the composite.

As used herein, the term "aggregate" refers to the smallest dispersible unit of the filler. For example, carbon black aggregates are made up of primary particles of carbon black and generally cannot be broken into smaller pieces by mechanical forces. As used herein, the term "agglomerate" refers to a plurality of aggregates in physical contact with one another and held together by physical forces. These agglomerates may be broken by mechanical forces into smaller units or particles; the smaller units may be aggregates, smaller agglomerates, or both.

A variety of methods may be employed to quantify microdispersion in filled elastomer composites. For example, the difference in conductivity between carbon black and rubber may be exploited to characterize the dispersion in carbon black-rubber composites. The conductivity of such composites depends primarily on the concentration and morphology (e.g., surface area, particle size, and structure) of the carbon black. In addition, the conductivity of these composites is influenced by the state of dispersion of the carbon black in the rubber matrix. The conductivity of a carbon black-rubber composite first increases, then decreases as the carbon black becomes more dispersed in the matrix (A. I. Medalia, "Electrical Conduction in Carbon Black Composites," *Rubber Chemistry and Technology*, 1986, Vol. 59, p. 432). The initial increase is attributed to the increasing distribution and dispersion of larger carbon black agglomerates, thereby decreasing the average distance between particles in the composite. Further improvements in dispersion lead to a decrease in conductivity. As noted above, this is attributed to the separation of small groups of individual carbon black aggregates within the system (Medalia, 1986).

In certain embodiments, a wet mix elastomer composite is prepared from natural rubber and carbon black. When the elastomer composite is processed using CTV Method A, the resulting vulcanized wet mix elastomer composite exhibits a resistivity having a natural logarithm that is at least about 10% higher, for example, at least about 15% higher or at least about 20% higher than the same property for a vulcanized dry mix elastomer composite having the same composition and prepared using CTV Comparative Method A. For example, the natural logarithm of the resistivity may be from about 12% to about 20% higher, from about 15% to about 40% higher, from about 20% to about 45% higher, from about 25% to about 50% higher, from about 30% to about 55% higher, or from about 35% to about 60% higher, or from about 40% to about 70% higher for the vulcanized wet mix composite than for the vulcanized dry mix composite.

As used herein, CTV Method A means compounding a masterbatch in a 1.6 L Banbury mixer using the formulation in Table 1 and the procedure in Table 2. After each Banbury mixing stage, compounds are sheeted on a 2-roll mill operated at ambient temperature and about 40 rpm with a nip gap of about 2 mm using 4 cross-cuts and 2 end-rolls, with a rest time between stage 1 and stage 2 mixing from 4-6 hours. Compounds are then cured in a press at 150° C. using a mold with a 2 mm thick spacer for a time determined by a conventional rubber rheometer (i.e., T90+10% of T90).

TABLE 1

| | Parts by weight |
|---|---|
| Natural Rubber | 100 |
| Carbon black | variable |
| Stearic acid | 2.5 |
| Zinc oxide | 3.0 |
| 6-PPD* | 2.0 |
| Sulfur | 1.2 |
| CBS** | 1.2 |

*N-(1,3-dimethylbutyl)-N'-phenyl-p-phenylenediamine
**Cyclohexyl benzothiazole sulfenamide

TABLE 2

| Stage 1 | |
|---|---|
| Fill factor (%) | 70 |
| Rotor speed (rpm) | 80 |
| Start temperature (° C.) | 60 |
| Time Masterbatch addition (s) | 0 |
| Time smalls addition (s) | 60 |
| Time for sweep (s) | 90 |
| Dump time (s) | 150 |
| Stage 2 | |
| Fill factor (%) | 65 |
| Rotor speed (rpm) | 60 |
| Start temperature (° C.) | 50 |
| Time masterbatch and curatives (s) | 0 |
| Time for sweep (s) | 30 |
| Dump time (s) | 60 |

As used herein, CTV Comparative Method A means preparing a vulcanized elastomer composite in a 1.6 L Banbury mixer using the formulation in Table 1 and the procedure in Table 3. After each Banbury mixing stage, compounds are sheeted on a 2-roll mill operated at ambient temperature and about 40 rpm with a nip gap of about 2 mm using 4 cross-cuts and 2 end-rolls, with a rest time between stage 1 and stage 2 mixing from 4-6 hours. Compounds are then cured in a press at 150° C. using a mold with a 2 mm thick spacer for a time determined by a conventional rubber rheometer (i.e., T90+10% of T90).

TABLE 3

| Stage 1 | |
|---|---|
| Fill factor (%) | 70 |
| Rotor speed (rpm) | 80 |
| Start temperature (° C.) | 60 |
| Time NR addition (s) | 0 |
| Time CB addition (s) | 30 |
| Time smalls addition (s) | 150 |
| Time for sweep (s) | 60, 180 |
| Dump time (s) | 240 |
| Stage 2 | |
| Fill factor (%) | 65 |
| Rotor speed (rpm) | 60 |
| Start temperature (° C.) | 50 |
| Time masterbatch and curatives (s) | 0 |
| Time for sweep (s) | 30 |
| Dump time (s) | 60 |

Handling of the vulcanized compounds can affect resistivity. To avoid skewing test results, the compounds should not be stored under conditions of high humidity or high temperature (e.g., greater than about 30 or 40° C.) for extended periods of time, nor should they be significantly mechanically deformed.

Because dispersion of carbon black and the conductivity of dispersed carbon black (e.g., the available surface for conductance) vary with carbon black morphology, it is convenient to use a parameter, called Delta, which can normalize data with respect to these variations. The value Delta, which has units of length, is different from the variable in the mechanical performance measure "tan delta". Here, it represents a theoretical average spacing between aggregates in a filled rubber system, assuming monodisperse particle size and perfectly random dispersion of particles (M-J. Wang, S. Wolff and E. H. Tan in *Rubber Chemistry and Technology*, 1993, Vol. 66, p 178). Even though these conditions do not exist in reality, it is a parameter that can be used to normalize data from filled systems with different grades and loadings of carbon black. The parameter Delta takes into account the particle size (through S), the particle structure (CDBP) and the loading ($\phi$) in each composite sample. The parameter Delta is defined as (Wang, et al., 1993):

$$\delta = \frac{6000 \left[0.806 \, \varphi^{-1/3} \beta^{-1/3} - 1\right]}{\rho S} \beta^{1.43} \quad \text{(Eqn. 1)}$$

where:
$\phi$=volume fraction of carbon black in the composite,
S=specific surface area of the carbon black in m$^2$/g measured by the nitrogen BET method,
$\rho$=carbon black density, assumed to be 1.8 g/cm$^3$, and
$\beta=\phi_{eff}/\phi$.
$\phi_{eff}$ is the effective volume fraction of carbon black taking into account occluded rubber. It is calculated from:

$$\phi_{eff}=[1+(0.0181*CDBP)]/1.59 \quad \text{(Eqn. 2)}$$

CDBP is the crushed DBP number of the carbon black measured according to ASTM method D3493.

In certain embodiments, inventive composites vulcanized according to CTV Method A may have a resistivity satisfying ln(resistivity)≥0.33δ+X, where X is 5.8. Alternatively, X may be 6.2. In either of these embodiments, the resistivity may also satisfy ln(resistivity)≤0.33δ+Y, where Y is 9.5.

Another method of quantifying microdispersion in filled composites is via ultra-small-angle neutron scattering (US-ANS). Use of USANS in a Bonse-Hart configuration is used to characterize the structure of one component in a multicomponent system (Schaefer, et al., Ultra-small-angle neutron scattering: a new tool for materials research, *Current Opinion in Solid State and Materials Science*, 8 (2004), 39-47). The range of dimensions over which small-angle scattering characterizes a system is directly proportional to the wavelength of the probing radiation. The principle of USANS is similar to that of small-angle laser light scattering, which exploits the difference in refractive indices of the components of a material to evaluate microstructure. In USANS, the neutrons probe microstructure based on the difference in the neutron scattering length density of the components. Systems that are not optically transparent can thus be probed using neutrons.

Neutron scattering intensity is a direct indicator of density fluctuations in a material. For example, a particle filled composite with an inhomogeneous distribution of filler would scatter neutrons more strongly than one in which the filler is more evenly distributed. The neutron scattering intensity is measured as a function of a wave vector Q, defined as $(2\pi/\lambda)\sin(\theta)$, where $\lambda$ is the neutron wavelength and $2\theta$ is the scattering angle. Three aspects of the state of dispersion contribute to the neutron scattering intensity when measured at a specific wave vector Q: the volume fraction of scattering objects in the system, the fraction of scattering objects with a radius of gyration equivalent to $2\pi/Q$, and the shape or morphology of scattering objects of size equivalent to $2\pi/Q$, e.g., the way the scattering objects are assembled. One of skill in the art will realize that, given a certain volume fraction of scattering objects, the size of the objects will dictate their spacing and thus the homogeneity of the system at a particular length scale.

The neutron scattering length density b of carbon black is higher than that of the components typically used in tire formulations, with the exception of zinc oxide, which is often used during vulcanization of carbon black filled rubber (Table 4). The loading of zinc oxide in rubber, however, is an order of magnitude lower than that of carbon black. As a result, carbon black dispersed in a hydrocarbon medium provides excellent scattering contrast for neutrons.

TABLE 4

| Components | b ($10 \times 10^{10}$ cm$^2$) |
|---|---|
| Carbon Black | 6 |
| Natural Rubber | 0.264 |
| Stearic Acid | −0.0603 |
| Zinc Oxide | 4.761 |
| Santoflex 6-PPD | 1.195 |
| Santocure TBBS* | 1.473 |
| Sulfur | 1.107 |

*N-tert-butyl-2-benzothiozolesulphenamide

Neutron scattering intensity I is defined as $$I(Q) = \phi_{CB}(1-\phi_{CB})(b_{medium}-b_{CB})^2 Z(Q) \quad \text{(Eqn. 3)}$$

where $\phi_{CB}$ is the volume fraction of carbon black in the elastomer composite, $b_{medium}$ is the neutron scattering length density of the elastomer matrix, $b_{CB}$ is the neutron scattering length density of carbon black, and Z(Q) is a descriptor for carbon black dispersion in the elastomer composite (Higgins, et al., *Polymers and Neutron Scattering*, Oxford University Press, 1994, p 125). The value of b for a given material may be calculated from its bulk density and elemental composition (Higgins, 1994, p 52). Those of skill in the art of neutron scattering can calculate b for natural rubber and carbon black given their bulk densities (0.9 g/cm$^3$ for natural rubber and 1.8 g/cm$^3$ for carbon black). For natural rubber, b is about $0.264*10^{10}$ cm$^{-2}$, and b is about $6*10^{10}$ cm$^{-2}$ for carbon black. However, the value of b for a vulcanized natural rubber matrix will vary depending on the cure system.

After USANS of a particle-filled composite, the resulting plot of I with respect to Q provides, among other things, two values that describe the microdispersion of carbon black in the elastomer. The intensity at a particular wave vector Q is correlated with the size of the scattering object (e.g., carbon black particles resulting from the breakup of carbon black pellets and their incorporation into the composite). The points on the plot can be fit to a function of the form $I = wQ^{-m}$, where w is a constant. The power-law exponent m describes the shape of carbon black particles having a size larger than $2\pi/Q$. In general, the larger the exponent, the more compact (e.g., less branched or smoother) the particles. For example, m is close to 4 for perfectly smooth spheres or ellipsoids, equal to 1 for rod-like scattering objects, about 2 for a random coil, and between 2 and 3 for branched structures.

For carbon black-filled elastomer composites, the following relationship provides a single value, called the Neutron Scattering Power Value (P), that describes both of these contributors to microdispersion:

$$P = \text{Log}(Z(Q_0) \times Q_0^{-m}) + 10 \quad \text{(Eqn. 4)}$$

where $Z(Q_0)$ is the value of Z at $Q_0$, determined after performing USANS on a carbon black filled elastomer composite according to Example 12, m is the power law exponent described above for neutron scattering intensity measured in the wave vector range $4*10^{-5}$ Å$^{-1} \leq Q \leq 9*10^{-5}$ Å$^{-1}$, and $Q_0$ is $4.3*10^{-5}$ Å$^{-1}$ and the logarithm is taken in base 10. $Q_0$ was determined by performing USANS on the elastomer composites described in Example 12 and identifying the smallest Q for which scattering from the filler could be distinguished from background scattering for the wet masterbatch samples. We have unexpectedly found that, for vulcanized elastomer composites prepared according to the invention, P does not vary significantly with loading or carbon black grade.

In certain preferred embodiments, carbon black filled elastomer vulcanizates prepared using CTV Method B exhibit a Neutron Scattering Power Value P less than about 0.5, for example, less than about 0, less than about −0.25, or less than about −0.5. In some embodiments, the Neutron Scattering Power Value is also greater than about −2, for example, greater than about −1.5 or greater than about −1.

As used herein, CTV Method B means compounding an elastomer composite with 7 phr of Perkadox PD-50S-ps and 1.5 phr of 6-PPD and vulcanizing the compound according to the procedure in Table 2. After each Banbury mixing stage compounds are sheeted on a 2-roll mill operated at ambient temperature and about 40 rpm with a nip gap of about 2 mm using 4 cross-cuts and 2 end-rolls, with a rest time between stage 1 and stage 2 mixing of 4-6 hours. Compounds are then cured in a press at 150° C. using a mold with a 1 mm thick spacer for a time determined by a conventional rubber rheometer (i.e., T90+10% of T90). Perkadox PD-50S-PS (Akzo Nobel Polymer Chemicals, LLC, Chicago, Ill.) is a curing package based on di(2,4-dichlorobenzoyl) peroxide. Handling of the vulcanized compounds can affect neutron scattering. To avoid skewing test results, the compounds should not be significantly mechanically deformed after vulcanization.

Production of Elastomer Masterbatch

By virtue of the method and apparatus disclosed here, dewatered coagulum can be processed to remove moisture while imparting specific amounts of work to the elastomer masterbatch and optionally compounding it with other materials. Masterbatch crumb or dewatered coagulum produced by a wet masterbatch process may have a moisture level that is too high for certain applications. By subjecting the elastomer masterbatch to mechanical mastication while removing water, mechanical energy can be imparted to the material without heating the material to a temperature at which the rubber properties might be degraded.

Certain embodiments of methods and apparatus for producing elastomer composites are discussed herein. While various embodiments of the invention can employ a variety of different fillers and elastomers, certain portions of the following description will, for convenience, describe their use primarily in producing elastomer composites including natural rubber and carbon black. One skilled in the art will recognize how to employ the method and apparatus disclosed here in accordance with the principles of operation discussed below to produce elastomer composites comprising a number of alternative or additional elastomers, fillers and other materials.

The masterbatch crumb may be produced using any wet masterbatch process, including those discussed below and processes such as those disclosed in, e.g., U.S. Pat. Nos. 5,763,388, 6,048,923, 6,841,606, 6,646,028, 7,101,922, 3,335,200, 3,403,121, and other wet masterbatch processes known to those of skill in the art. In general, an elastomer latex fluid and a particulate slurry are combined, and the elastomer latex is caused to coagulate to form a masterbatch crumb. The masterbatch crumb may be dewatered to form a dewatered coagulum.

Suitable elastomer latex fluids include both natural and synthetic elastomer latices and latex blends. The latex should be appropriate for the wet masterbatch process selected and the intended purpose or application of the final rubber product. It will be within the ability of those skilled in the art to select suitable elastomer latex or a suitable blend of elastomer latices for use in the methods and apparatus disclosed here, given the benefit of this disclosure. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. The latex may be in an aqueous carrier liquid. Particular suitable synthetic rubbers include: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alphamethylene carboxylic acids and the esters and amides thereof such as acrylic acid and dialkylacrylic acid amide. Also suitable for use herein are copolymers of ethylene and other high alpha olefins such as propylene, 1-butene and 1-pentene. As noted further below, the rubber compositions can contain, in addition to the elastomer and filler, a coupling agent, and optionally, various processing aids, oil extenders and antidegradents.

Exemplary natural rubber latices include but are not limited to field latex, latex concentrate (produced, for example, by evaporation, centrifugation or creaming), skim latex (e.g., the supernatant remaining after production of latex concentrate by centrifugation) and blends of any two or more of these in any proportion. The latex should be appropriate for the wet masterbatch process selected and the intended purpose or application of the final rubber product. The latex is provided typically in an aqueous carrier liquid. Selection of a suitable latex or blend of latices will be well within the ability of those skilled in the art given the benefit of the present disclosure and the knowledge of selection criteria generally well recognized in the industry.

The particulate filler fluid may be carbon black slurry or any other suitable filler in a suitable carrier fluid. Selection of the particulate filler or mixture of particulate fillers will depend largely upon the intended use of the elastomer masterbatch product. As used here, particulate filler can include any material which is appropriate for use in the masterbatch process used to produce the masterbatch crumb. Suitable particulate fillers include, for example, conductive fillers, reinforcing fillers, fillers comprising short fibers (typically having an L/D aspect ratio less than 40), flakes, etc. In addition to carbon black and silica-type fillers, discussed in more detail below, fillers can be formed of clay, glass, polymer, such as aramid fiber, etc. It is expected that any filler suitable for use in elastomer compositions may be incorporated into elastomer composites according to various embodiments of the invention. Of course, blends of the various particulate fillers discussed herein may also be used.

When a carbon black filler is used, selection of the carbon black will depend largely upon the intended use of the elastomer masterbatch product. Optionally, the carbon black filler can include also any material which can be slurried and combined with a latex in the particular wet masterbatch process selected by the skilled artisan. Exemplary particulate fillers include but are not limited to carbon black, fumed silica, precipitated silica, coated carbon black, chemically functionalized carbon blacks, such as those having attached organic groups, and silicon-treated carbon black, either alone or in combination with each other. Exemplary carbon blacks include ASTM N100 series—N900 series carbon blacks, for example N100 series carbon blacks, N200 series carbon blacks, N300 series carbon blacks, N700 series carbon blacks, N800 series carbon blacks, or N900 series carbon blacks. Elastomer composites containing ASTM N100 and N200 series blacks may especially benefit from the teachings herein. Carbon blacks sold under the Regal®, Black Pearls®, Spheron®, Sterling®, and Vulcan® trademarks available from Cabot Corporation, the Raven®, Statex®, Furnex®, and Neotex® trademarks and the CD and HV lines available from Columbian Chemicals, and the Corax®, Durax®, Ecorax®, and Purex® trademarks and the CK line available from Evonik (Degussa) Industries, and other fillers suitable for use in rubber or tire applications, may also be exploited for use with various embodiments. Suitable chemically functionalized carbon blacks include those disclosed in International Application No. PCT/US95/16194 (WO 96/18688), the disclosure of which is hereby incorporated by reference.

Exemplary carbon blacks include but are not limited to the carbon blacks in Table 5 below, the use of which is described in the examples. CXG100 is an experimental furnace black having particular utility in, e.g., high performance tire applications.

TABLE 5

| Grade | STSA (m²/g) | CDBP (mL/100 g) |
|---|---|---|
| N234 | 112 | 102 |
| N115 | 124 | 97 |
| CRX1346 | 155 | 101 |
| BP880 | 197 | 90 |
| N134 | 135 | 103 |
| N120 | 122 | 98 |
| N326 | 78.5 | 67 |
| N347 | 83 | 96 |
| N110 | 117 | 98 |
| CRX1490 | 174 | 102 |
| CXG100 | 147 | 87 |

Carbon blacks having high surface areas, for example, N100 or N200 series carbon blacks or higher surface area carbon blacks having, e.g., STSA greater than 135 m²/g, and/or high levels of structure, for example, CDBP of 85 mL/100 g or greater, may especially benefit from the teachings herein. In certain embodiments, the filler is a carbon black having an STSA from about 75 m²/g to about 260 m²/g, for example, from about 80 m²/g to about 250 m²/g, from about 90 m²/g to about 230 m²/g, from about 100 m²/g to about 160 m²/g, from about 110 m²/g to about 240 m²/g, from about 120 m²/g to about 190 m²/g, from about 130 m²/g to about 220 m²/g, from about 140 m²/g to about 170 m²/g, from about 150 m²/g to about 200 m²/g, from about 160 m²/g to about 180 m²/g, from about 170 m²/g to about 210 m²/g, or from about 180 m²/g to about 215 m²/g. In certain embodiments, the filler is a carbon black having a structure value as measured by CDBP from about 40 mL/100 g to about 110 mL/100 g, for example, from about 50 mL/100 g to 100 mL/100 g, from about 60 mL/100 g to about 105 mL/100 g, from about 70 mL/100 g to about 95 mL/100 g, from about 80 mL/100 g to about 110 mL/100 g, from about 90 mL/100 g to about 110 mL/100 g, or from about 95 mL/100 g to about 110 mL/100 g. Alternatively or in addition, the CDBP value may be at least about 65 mL/100 g, at least 75 mL/100 g, or at least 85 mL/100 g. The use of mechanical mastication in combination with the removal of water can bring particular benefits to carbon black filled elastomers employing highly structured blacks, for example, carbon blacks having a CDBP value of at least about 85 mL/100 g, for example, at least about 90 mL/100 g, at least about 95 mL/100 g, or at least about 105 mL/100 g.

Higher structure blacks are more reinforcing, and elastomer composites produced with these blacks are more viscous than elastomer composites produced with carbon blacks having lower levels of structure. The increase in viscosity makes compounding these elastomer composites more difficult, i.e., it is difficult for compounding equipment to knead these materials. Mechanical mastication coupled with moisture removal reduces the viscosity of elastomer composites loaded with highly structured blacks. Nonetheless, these highly reinforced elastomer composites remain relatively viscous, and mechanical mastication procedures may need to be adjusted to impart appropriate amounts of energy, as discussed further below.

Both silicon-coated and silicon-treated carbon blacks may be employed in various embodiments. In silicon-treated carbon black, a silicon containing species such as an oxide or carbide of silicon is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silicon-coated carbon blacks.

The materials described herein as silicon-treated carbon blacks are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. A variety of silicon-treated blacks are available from Cabot Corporation under the name Ecoblack™ It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. No. 6,929,783.

As noted above, additives may be used, and in this regard coupling agents useful for coupling silica or carbon black should be expected to be useful with the silicon-treated carbon blacks. Carbon blacks and numerous other suitable particulate fillers are commercially available and are known to those skilled in the art.

One or more additives also may be pre-mixed, if suitable, with the particulate slurry or with the elastomer latex fluid or may be combined with the masterbatch crumb during coagulation. Additives also can be mixed into the elastomer masterbatch subsequently, e.g., by dry mixing techniques. Numerous additives are well known to those skilled in the art and include, for example, antioxidants, antiozonants, plasticizers, processing aids (e.g., liquid polymers, oils and the like), resins, flame-retardants, extender oils, lubricants, and a mixture of any of them. Exemplary additives include but are not limited to zinc oxide and stearic acid. The general use and selection of such additives is well known to those skilled in the art.

The particulate filler slurry may be produced according to any technique known to those of skill in the art. In an exemplary method employing carbon black pellets, the pellets are combined with water, and the resulting mixture is passed through a colloid mill, pipeline grinder, or the like to form a dispersion fluid. This fluid is then passed to a homogenizer that more finely disperses the carbon black in the carrier liquid to form the slurry. Exemplary homogenizers include but are not limited to the Microfluidizer® system commercially available from Microfluidics International Corporation (Newton, Mass., USA). Also suitable are homogenizers such as models MS 18, MS45 and MC120 Series homogenizers available from the APV Homogenizer Division of APV Gaulin, Inc. (Wilmington, Mass., USA). Other suitable homogenizers are commercially available and will be apparent to those skilled in the art given the benefit of the present disclosure. The optimal operating pressure across the homogenizer may depend on the actual apparatus, the filler composition and the filler content. In embodiments employing carbon black, the homogenizer may be operated at a pressure from about 10 psi to about 5000 psi, for example, about 10 psi to about 1000 psi, about 1000 psi to about 1700 psi, about 1700 psi to about 2200 psi, about 2200 psi to about 2700 psi, about 2700 psi to about 3300 psi, about 3300 psi to about 3800 psi, about 3800 psi to about 4300 psi, or about 4300 psi to about 5000 psi. Depending on the wet masterbatch method employed, a high carbon black content may be used to reduce the task of removing excess water or other carrier. In the wet masterbatch method described below, about 5 to 30 weight percent carbon black may be employed, for example, from about 5 to about 9 weight percent, from about 9 to about 12 weight percent, from about 12 to about 16 weight percent, from about 16 to about 20 weight percent, from about 20 to about 24 weight percent, from about 24 to about 27 weight percent, or from about 27 to about 30 weight percent. Those skilled in the art will recognize, given the benefit of this disclosure, that the carbon black content (in weight percent) of the slurry should be coordinated with other process variables during the wet masterbatch process to achieve a desired carbon black content (in phr) in the ultimate product.

The slurry preferably is used in masterbatch production immediately upon being prepared. Fluid conduits carrying the slurry and any optional holding tanks and the like should establish or maintain conditions which substantially preserve the dispersion of the carbon black in the slurry. That is, substantial reagglomeration or settling out of the particulate filler in the slurry should be prevented or reduced to the extent reasonably practical.

In certain preferred embodiments, the masterbatch crumb is produced in a continuous flow process involving mixture of elastomer latex and particulate filler fluids at turbulence levels and flow control conditions sufficient to achieve coagulation even without use of traditional coagulating agents. Such methods are disclosed, for example, in U.S. Pat. No. 6,048,923. In brief, an exemplary method for preparing masterbatch crumb involves feeding simultaneously a slurry of carbon black or other filler and a natural rubber latex fluid or other suitable elastomer fluid to a mixing zone of a coagulum reactor. A coagulum zone extends from the mixing zone, preferably progressively increasing in cross-sectional area in the downstream direction from an entry end to a discharge end. The slurry is fed to the mixing zone preferably as a continuous, high velocity jet of injected fluid, while the natural rubber latex fluid is fed at relatively low velocity. The high velocity, flow rate and particulate concentration of the filler slurry are sufficient to cause mixture and high shear of the latex fluid, flow turbulence of the mixture within at least an upstream portion of the coagulum zone, and substantially completely coagulate the elastomer latex prior to the discharge end. Substantially complete coagulation can thus be achieved without the need for an acid or salt coagulation agent.

After the substantially complete coagulation of the elastomer latex and particulate fluid, masterbatch crumb in the form of "worms" or globules is formed and discharged from the discharge end of the coagulum reactor as a substantially constant flow concurrently with the on-going feeding of the latex and carbon black slurry streams into the mixing zone of the coagulum reactor. Notably, the plug-type flow and atmospheric or near atmospheric pressure conditions at the discharge end of the coagulum reactor are highly advantageous in facilitating control and collection of the elastomer composite product, such as for immediate or subsequent further processing steps. The masterbatch crumb is created and then formed into a desirable extrudate, for example, having about 70-85% water content. After formulation, the masterbatch crumb is passed to suitable drying and compounding apparatus.

Figure 2:
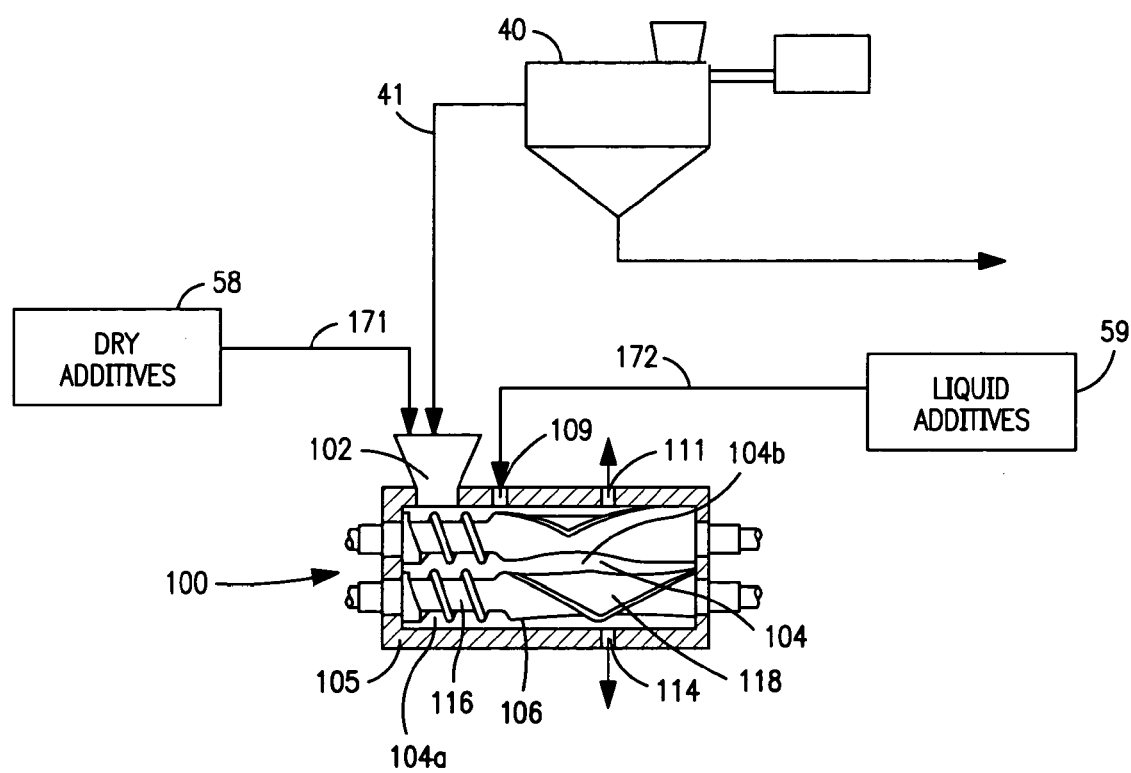
FIG. 2 is a schematic flowchart of a portion of an alternative embodiment of the masterbatch production line of FIG. 1 showing the continuous compounder of FIG. 1 in section.

In the embodiment shown in FIGS. 1 and 2, the masterbatch crumb is passed from coagulum reactor 14 via conveying means 101, which may be a simple gravity drop or other suitable apparatus, to a de-watering extruder 40. Suitable de-watering extruders are well known and commercially available from, for example, the French Oil Mill Machinery Co. (Piqua, Ohio, USA). Water is discharged from de-watering extruder 40 via effluent stream 43.

The dewatering extruder may bring natural rubber masterbatch crumb from, e.g., approximately 70-85% water content to approximately 1% to 20% water content, for example, from about 1% to about 3% water content, from about 3% to about 5% water content, from about 4% to about 6% water content, from about 5% to about 10% water content, from about 10% to about 15% water content, from about 13% to about 17% water content, or from about 15% to about 20% water content. In certain embodiments, the de-watering extruder reduces the water content of a natural rubber extrudate to about 15%. The optimal water content may vary with the elastomer employed, the type of filler, and the devices employed for mastication of the dewatered coagulum. If the water content is too high, then the water will serve as a lubricant and reduce friction during mastication. Without being bound by any particular theory, it is believed that such processing will not substantially improve rubber-filler interactions or rubber properties. If the water content is too low, then mastication will increase the temperature of the material and degrade the rubber without promoting polymer-filler interactions.

Regardless of the wet masterbatch method employed, masterbatch crumb may be dewatered to a desired water content, following which the resulting dewatered coagulum is further masticated while being dried to a desired moisture level (e.g., from about 0.5% to about 3%, for example, from about 0.5% to about 1%, from about 1% to about 3%, about 2% to about 3%, or from about 1% to about 2%). We have unexpectedly found that it is the mechanical energy imparted to the material, not the apparatus with which the dewatered coagulum is worked, that provides the observed improvement in rubber properties. For example, the dewatered coagulum may be mechanically worked with one or more of a continuous mixer, an internal mixer, a twin screw extruder, a single screw extruder, or a roll mill. Suitable masticating devices are well known and commercially available, including for example, a Unimix Continuous Mixer and MVX (Mixing, Venting, eXtruding) Machine from Farrel Corporation of Ansonia, Conn., a long continuous mixer from Pomini, Inc., a Pomini Continuous Mixer, twin rotor corotating intermeshing extruders, twin rotor counterrotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer. Alternative masticating apparatus suitable for use with various embodiments of the invention will be familiar to those of skill in the art.

As dewatered coagulum is processed in a desired apparatus, the apparatus imparts energy to the material. Without being bound by any particular theory, it is believed that friction generated during mechanical mastication heats the dewatered coagulum. Some of this heat is dissipated by heating and vaporizing the moisture in the dewatered coagulum. Without wishing to be being bound by any particular theory, it is believed that practically all water removed from the dewatered coagulum via mastication is removed by heating the water and evaporating it, not by squeezing it from the coagulum. Thus, depending on how mastication occurs in a particular apparatus, the optimal moisture content for the dewatered coagulum will vary. The temperature of the dewatered coagulum within an apparatus may ramp up to a certain level, be maintained at a particular level, or both. The temperature should be sufficiently high to rapidly vaporize water that becomes exposed to the atmosphere within the apparatus, but not so high as to scorch the rubber. In certain embodiments, the dewatered coagulum achieves a temperature from about 130° C. to about 190° C., for example, from about 140° C. to about 160° C. or from about 150° C. to about 165° C.

In certain embodiments, at least about 0.9 MJ/kg, for example, at least about 1.3 MJ/kg, at least about 1.7 MJ/kg, at least about 2 MJ/kg, at least about 2.3 MJ/kg, or at least about 2.6 MJ/kg of energy may be imparted to the material. In some embodiments, at most about 3 MJ/kg or at most about 4 MJ/kg of energy is imparted to the material. The optimal amount of energy will depend on the apparatus being used, the temperature of the dewatered coagulum during processing, the carbon black structure and loading, and the water content of the dewatered coagulum.

In certain preferred embodiments, additives can be combined with the dewatered coagulum in the mechanical mixer. Specifically, additives such as filler (which may be the same as, or different from, the filler used in the coagulum reactor; exemplary fillers include silica and zinc oxide, with zinc oxide also acting as a curing agent), other elastomers, other or additional masterbatch, antioxidants, antiozonants, plasticizers, processing aids (e.g., stearic acid, which can also be used as a curing agent, liquid polymers, oils, waxes, and the like), resins, flame-retardants, extender oils, lubricants, and a mixture of any of them, can be added in the mechanical mixer. In certain other preferred embodiments, additional elastomers can be combined with the dewatered coagulum to produce elastomer blends. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene, and the like. Methods of producing masterbatch blends are disclosed in our commonly owned U.S. Pat. Nos. 7,105,595, 6,365,663, and 6,075,084.

FIG. 2 schematically illustrates a subsystem 58 for introducing dry additives via conduit 171 and feed port 102 into continuous compounder 100. Also schematically illustrated in FIG. 2 is subsystem 59 for introducing liquid additives via conduit 172 and feed port 109 into continuous compounder 100. Conduits 171 and 172 may be, for example, pipes, conveyor belts, or other suitable apparatus for transporting material from the respective subsystem to continuous compounder 100. It is to be appreciated that any combination of elastomers, additives and additional masterbatch may be added to the dewatered coagulum in continuous compounder 100.

In the embodiment shown in FIGS. 1 and 2, the dewatered coagulum is fed from de-watering extruder 40 via conveyor or simple gravity drop or other suitable apparatus 41 into feed port 102 formed in an elongate processing chamber 104 of continuous compounder 100. In certain exemplary embodiments, feed port 102 is a feed hopper which facilitates a gravity drop of the dewatered coagulum from de-watering extruder 40. Feed port 102 may also be fed via a conveyance such as a conveyor belt, conduit, pipe, or any other suitable apparatus for transporting elastomer masterbatch. Processing chamber 104 is contained within housing 105 of continuous compounder 100. Elongate rotors 106 are seen to be parallel to each other and axially oriented in processing chamber 104. Rotors 106 are driven by motor 108 via gear reducer 110 and bearings 112. Rotors 106 are adapted in accordance with known designs for processing material axially through elongate processing chamber 104. As seen in FIG. 2, multiple rotors 106 are axially oriented in processing chamber 104. Rotors 106 preferably are segmented, with different segments optionally having different thread or screw configurations. In a preferred embodiment, processing chamber 104 houses two rotors 106 having different profiles. Suitable rotors 106 having different profiles include, for example, rotor model numbers 7 and 15 from Farrel Corporation of Ansonia Conn. One of skill in the art will recognize that alternative rotor combinations may be suitable for particular elastomer masterbatch compositions depending on the elastomer composition, the filler composition, the filler morphology, the loading, and other characteristics of the masterbatch. In a preferred embodiment, rotors 106 contain a fluid mechanism or other apparatus that can be temperature controlled to provide heating and/or cooling to the dewatered coagulum as it passes through the compounder 100.

As seen in the embodiment illustrated in FIG. 2, each rotor 106 has a first segment 116 and a second segment 118. The portions of the processing chamber that contain the first and second segments, e.g. hopper 104a and mixing chamber 104b, may be heated or cooled independently. In certain embodiments, first segment 116 of each rotor is a feed screw and second segment 118 has a profile selected to provide mastication to the dewatered coagulum. As the dewatered coagulum passes through processing chamber 104, the rotors masticate the material, thereby mixing and drying the dewatered coagulum. Port 109 is provided in processing chamber 104 for the addition of liquid additives. Dry materials can be added to the dewatered coagulum via feed port 102. Vent 111 is provided in processing chamber 104 to allow moisture to vent as the dewatered coagulum dries. The dewatered coagulum exits processing chamber 104 via discharge orifice 114. The temperature of the dewatered coagulum may be controlled by providing appropriate temperature coolant or heating water to the processing chamber 104 or the rotors.

Depending on the elastomer masterbatch composition, the optimal temperature of the hopper 104a, mixing chamber 104b, and rotors 106 may be different during startup and once the process is fully underway. Control of the operating parameters of continuous compounder 100 allows control of the amount of mechanical energy delivered to the dewatered coagulum and the rate of removal of water. Such operating parameters include throughput rate of the continuous compounder, rotor speed and temperature, discharge orifice size and temperature, power draw, and processing chamber temperature. Similar parameters may be varied for other apparatus that may be used to masticate the dewatered coagulum.

In certain embodiments, the speed of the rotors may be from about 140 to about 400 rpm. Higher speeds may be desired for elastomer masterbatches with lower loadings of filler or fillers having lower surface areas to increase mastication and improve water removal, since such fillers do not generate much heat through friction against the coagulated latex. Lower speeds may be necessary to control the energy input and temperature in highly reinforced elastomer masterbatches, since such masterbatches are more viscous and require more power to masticate. Likewise, the rotors may be maintained at lower temperatures, e.g., using about 4° C. water to cool the rotor, to optimize removal of heat from highly reinforced elastomer masterbatches, but heated water, e.g., about 90° C., may be used to heat the rotors to enhance water removal from softer, semi-reinforced elastomer masterbatches.

The hopper 104a and mixing chamber 104b may be heated or cooled with water or other coolant having the same or different temperatures than that cooling the rotors and may be independently heated and/or cooled. For example, hopper 104a and mixing chamber 104b may be heated or cooled with water having, e.g., a temperature from about 4° C. water to about 90° C., or depending on the composite composition, a temperature outside of this range. For example, the water may be from about 4° C. to about 10° C., from about 10° C. to about 20° C., from about 20° C. to about 30° C., from about 30° C. to about 40° C., from about 40° C. to about 50° C., from about 50° C. to about 60° C., from about 60° C. to about 70° C., from about 70° C. to about 80° C., or from about 80° C. to about 90° C.

However, the optimal temperatures for each rotor 106 and the portions of the processing chamber 104 also depend on the throughput of the continuous compounder 100. For example, highly reinforced elastomer masterbatches may require cooling for lower throughputs, e.g., 250 to 350 or 400 kg/hr. However, at higher throughputs, e.g., closer to 700 kg/hr, the rotors 106 and the processing chamber 104 may need to be heated to remove water from even highly reinforced elastomer masterbatches. The throughput of the continuous compounder 100 may be adjusted depending on the throughput rate of upstream processes, downstream processes, or both.

The residence time of the dewatered coagulum within continuous compounder 100 is controlled in part by adjusting the discharge orifice 114. For elastomer masterbatches with higher surface area fillers, shorter residence times may be desired and, in certain embodiments, the discharge orifice is adjusted to be 75-100% open, preferably 90-100% open. For softer elastomer masterbatches that are not as highly reinforced, the discharge orifice may be more closed. In certain embodiments, the discharge orifice is at least 50% open.

The temperature of the masticated coagulum output from the continuous compounder 100 through discharge orifice 114 is cascaded back into the controls of the continuous compounder to adjust the power draw of the continuous compounder, i.e., the amount of work delivered to the dewatered coagulum by the rotors. In certain embodiments, the temperature of the continuous compounder output is from about 130° C. to about 190° C., for example, from about 140° C. to about 180° C., from about 150° C. to about 170° C., or from about 155° C. to about 165° C. One of skill in the art will realize that at lower temperatures, more time may be required to remove moisture from the masticated coagulum. At higher temperatures, e.g., warmer than 170° C., it may be desirable to limit processing time to prevent degradation of the rubber.

In another embodiment, the dewatered coagulum is masticated using an internal mixer such as a Banbury mixer. The masterbatch crumb may first be brought to a moisture content of about 3% to about 7%, for example, about 5% to about 6%, or about 3% to about 5%. The moisture content may be achieved by dewatering to the desired level or by dewatering the masterbatch crumb to a higher moisture content and then further reducing moisture content by heating the resulting dewatered coagulum, by letting water evaporate from the dewatered coagulum at room temperature, or by other methods familiar to those of skill in the art. The dewatered coagulum may then be masticated in an internal mixer until a desired moisture level or mechanical energy input is achieved. In some embodiments, the dewatered coagulum is masticated until it reaches a predetermined temperature, allowed to cool, and then placed back into the internal mixer one or more times to impart additional energy to the material. In certain embodiments, preferred temperatures are from 140° C. to about 165° C., for example, from about 145° C. to about 160° C., or from 150° C. to about 155° C. The dewatered coagulum may be sheetied in a roll mill after each mastication in the internal mixer. Alternatively or in addition, dewatered coagulum that has been masticated in a Banbury mixer may be further masticated in an open mill.

For highly reinforced materials, e.g., materials having high loadings of moderate surface area/high structure filler or materials having even moderate loadings of high surface area/high structure fillers, significant amounts of friction are generated by the interaction of the compounding equipment and the dewatered coagulum. Thus, the operating conditions of the equipment may need to be adjusted to accommodate such materials. For example, to process even moderately loaded (e.g., at least 40 phr or at least 42 phr) composites filled with CRX 1490, which has relatively high structure and surface area (CDBP 102 mL/100 mg, STSA 174 m$^2$/g), a Farrell Continuous Mixer was operated at less than 200 rpm, and the production rate was reduced with respect to production of less highly reinforced composites. At lower production rates, it is necessary to pay careful attention to the operating temperature, because the higher residence times, in combination with the increased friction, can allow the temperature of the dewatered coagulum to increase rapidly. In another example, for highly structured carbon blacks, it may be necessary to pre-load a composite having a lower filler loading onto the open mill and then gradually increase the loading of material processed through the open mill until the desired composition is attained. Indeed, the choice of mastication equipment may be dictated in part by the performance limits of particular equipment and its ability to be operated controllably at the production rates and power levels for optimal processing of composites having desired loading levels of particular fillers.

In an alternative embodiment, the dewatering extruder both removes moisture from the masterbatch crumb and masticates the material. As the dewatering extruder is used to remove a higher fraction of the moisture from the masterbatch crumb, it masticates the material. For example, the dewatering extruder may be used to masticate the material while bringing the moisture content to from about 1% to about 3%. This material may then be further masticated on an open mill or other device to reduce the moisture content still further.

Regardless of how the dewatered coagulum is masticated, it has unexpectedly been found that additional mastication accompanied by the removal of even minimal amounts of water from the masticated coagulum further improves rubber performance. The mechanism is not perfectly understood, but, without being bound by any particular theory, it is believed that friction resulting from mastication improves the interaction between the elastomer matrix and the filler, while evaporation of moisture from the masticated coagulum dissipates heat generated by friction as the masticated coagulum is further masticated. In some embodiments, as little as about 0.3 MJ/kg of mechanical energy is imparted to the masticated coagulum, for example, at least about 0.7 MJ/kg, at least about 1 MJ/kg, or from about 0.3 MJ/kg to about 1 MJ/kg or to about 1.5 MJ/kg.

In certain embodiments, the masticated coagulum is fed to an open mill. In the embodiment shown in FIGS. 1 and 2, the masticated coagulum is discharged from the continuous compounder as a length of extrudate and may be cut into smaller lengths prior to entering open mill 120. The masticated coagulum may optionally be fed to open mill 120 via conveyor 119. Conveyor 119 may be a conveyor belt, conduit, pipe, or other suitable means for transporting the masticated coagulum from continuous compounder 100 to open mill 120. Open mill 120 includes a pair of rollers 122 that may optionally be heated or cooled to provide enhanced operation of open mill 120. Other operating parameters of open mill 120 include the gap distance between the rolls, the bank height, i.e., the reservoir of material in the gap between and on top of the rolls, and the speed of each roll. The speed of each roll and the temperature of the fluid used to cool each roll may be controlled independently for each roll. In certain embodiments, the gap distance may be from about 5 mm to about 10 mm or from about 6 mm to about 8 mm. The roll speed may be about 15-19 rpm, and the rollers may roll towards one another with respect to the inlet side of the mill. The friction ratio, the ratio of the speed of the collection roller, e.g., the roller on which the masticated coagulum collects, to that of the back roller, may be from about 0.9 to about 1.1. The fluid employed to cool the rollers may be from about 35° C. to about 90° C., for example, from about 45° C. to about 60° C., from about 55° C. to about 75° C., or from about 70° C. to about 80° C. In addition to controlling the operation of the open mill to provide a desired level of mastication and desiccation to the masticated coagulum, it is also desirable that the output of the open mill 120 should collect on the collection roller as a smooth sheet. Without being bound by any particular theory, it is thought that cooler roller temperatures facilitate this goal. In certain embodiments, open mill 120 may reduce the temperature of the masticated coagulum to approximately 110-140° C. The residence time of the masticated coagulum in the mill is determined in part by the roller speed, the gap distance and the amount of mastication desired and may be about 10-20 minutes for material that has been masticated in an FCM. The energy input into the masticated coagulum may be measured by the power consumption of the apparatus.

One skilled in the art will recognize that different combinations of devices may be employed to provide mastication and desiccation to wet masterbatch materials. Depending on which devices are used, it may be desirable to operate them under different conditions than those described above to impart varying amounts of work and desiccation to the masterbatch. In addition, it may be desirable to employ more than one of a particular kind of device, e.g., an open mill or internal mixer, in series or to pass masticated coagulum through a given device more than one time. For example, masticated coagulum may be passed through an open mill two or three or more times or passed through two or three or more open mills in series. In the latter case, it may be desirable to operate each open mill under different operating conditions, e.g., speed, temperature, etc. In certain embodiments, masticated coagulum is passed through one, two, or three open mills after being masticated in an internal mixer.

In certain embodiments, elastomer composite may be used in or produced for use in various parts of a tire, for example, tires, tire treads, tire sidewalls, wire-skim for tires, and cushion gum for retread tires. Alternatively or in addition, elastomer composite may be used for tracks and track pads for track-propelled equipment such as bulldozers, etc., mining equipment such as screens, mining equipment linings, conveyor belts, chute liners, slurry pump liners, mud pump components such as impellers, valve seats, valve bodies, piston hubs, piston rods, and plungers, impellers for various applications such as mixing slurries and slurry pump impellers, grinding mill liners, cyclones and hydrocyclones, and expansion joints, marine equipment such as linings for pumps (e.g., dredge pumps and outboard motor pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other applications where abrasion resistance is desired. The vulcanized composite may be used in rollers, cams, shafts, pipes, tread bushings for vehicles, or other applications where abrasion resistance is desired.

Traditional compounding techniques may be used to combine vulcanization agents and other additives known in the art with the elastomer composite, depending on the desired use. Even though such compounding adds mechanical energy to the masterbatch, water is typically not removed. Without water removal, compounding does not confer the benefits provided by preferred embodiments of the invention.

The present invention will be further clarified by the following examples which are intended to be only exemplary in nature.

EXAMPLES

Methods

In the following examples, coagulated wet masterbatches were produced by impacting a stream of natural rubber latex with a relatively higher velocity stream of a carbon black slurry. The coagulated masterbatch crumb, which contained between 70 and 85% water, was de-watered (DW) to about 10-20% water using a dewatering extruder (French Oil Mill Machinery Company, Piqua, Ohio) before any further processing except as indicated. Under these conditions, the dewatering process is considered to impart minimal mechanical energy to the rubber of the masterbatch crumb. Some of the dewatered coagulum and masterbatch crumb, as indicated below, was dried in a circulating air oven set at 60° C. for 24 h. This typically reduced the water content to about 2-4%, regardless of whether the samples were taken from dewatered coagulum or masterbatch crumb that had not been dewatered. Certain dewatered samples, as indicated below, were allowed to dry in a fume hood at room temperature. Unless indicated otherwise, this typically reduced the water content to about 5-6%.

The performance of various masterbatches was tested by compounding and vulcanizing samples. Unless specified otherwise, the formulation of the material for vulcanization used is given in Table 6 and the compounding procedure is given in Table 7. This compounding process adds about 1.6-1.9 MJ/kg of mechanical energy to the masterbatch. This figure was not included in the calculated energy inputs included in Tables 8-15 below because water was not removed from the samples during compounding. Vulcanization was carried out in a heated press set at 150° C. for a time determined by a conventional rubber rheometer (i.e., T90+10% of T90, where T90 is the time to achieve 90% vulcanization).

Performance test results are set forth below. The tensile stress of vulcanized samples (T300 and T100) were measured according to ASTM standard D-412. Dynamic mechanical properties were determined using a dynamic strain sweep at 10 Hz and 60° C. The Payne effect is defined as the difference between the maximum and minimum storage moduli measured during the sweep. Tan $\delta_{max}$ is taken as the maximum value of tan δ within this range of strains.

TABLE 6

| Ingredient | Parts by weight |
| --- | --- |
| Masterbatch | Sufficient to give 100 parts of rubber |
| 6PPD | 1.5 |
| ZnO | 4.0 |
| Stearic acid | 2.0 |
| TBBS | 0.8 |
| Sulfur | 1.2 |

TABLE 7

| | Stage 1 | Stage 2 |
| --- | --- | --- |
| Fill factor | 0.75 | 0.65 |
| Rotor Speed | 80 rpm | 60 rpm |
| Ram pressure | 2.8 bar | 2.8 bar |
| Cooling water temperature | 50° C. | 50° C. |
| Mixing Sequence | Time 0-add masterbatch 1 min-add smalls 2.5 min-dump | Time 0-add product of stage 1 and curatives 1 min-dump |
| Open Mill | Four crosscuts and two endrolls | Four crosscuts and two endrolls; sheet off to required thickness for testing |

Example 1

Natural rubber masterbatch including 52 phr of N234 carbon black was produced using the wet masterbatch process described in the Methods section above. The masterbatch was dewatered to about 15% water content, following which four samples were prepared. Sample 1A was dried for 24 hours at 60° C. Sample 1B was dried in the same manner and then masticated in a Banbury mixer (fill factor=0.75; ram pressure=2.8 bar; cooling water temperature=50° C.; material added at 80 rpm and masticated at 150-170 rpm and dumped at 160° C.), following which it was open milled (temperature=180° F.) for six minutes. This Banbury mixing procedure followed by roll-milling is termed one Banbury cycle. Sample 1C was dried at 60° C., subjected to one Banbury mastication cycle, and then masticated in the Banbury a second time under the same conditions and open milled for 10 minutes (i.e., two Banbury cycles). Sample 1D was allowed to partially dry at room temperature, then masticated in the Banbury through two cycles. The energy input into the material in the Banbury mixer during each Banbury cycle was recorded; sheeting the material at the end of the Banbury cycle adds energy to the material, but the amount of energy is very small in comparison to that imparted in the Banbury. The results of vulcanizate testing, given in Table 8, are indexed to the value for the Sample 1A.

TABLE 8

| Sample Number | 1A | 1B | 1C | 1D |
| --- | --- | --- | --- | --- |
| Comparative Example? | Yes | No | No | No |
| Treatment summary | Dried at 60° C. | Dried at 60° C., Banbury, Roll mill | Dried at 60° C., Banbury ×2, Roll mill | Dried at RT, Banbury ×2, Roll mill |
| Post-dewatering mechanical energy input, MJ/kg | 0 | 3.1 | 5.2 | 5.9 |
| T300/T100 Index, % | 100 | 106 | 109 | 118 |
| Payne Effect index, % | 100 | 73 | 61 | 55 |
| tan $\delta_{max}$ Index, % | 100 | 95 | 90 | 87 |

The data show that while mastication improves the mechanical performance of the final vulcanizate, mastication in combination with water removal provides an even greater improvement in performance.

Example 2

Natural rubber masterbatches were produced by the wet masterbatch process described in the Methods section using the grades and loadings of carbon black identified in Table 9. The de-watered coagulum was either dried in an oven at 60° C. (comparative examples) or passed through a Farrel Continuous Mixer (FCM)(280-320 rpm; 350-400 kg/hr; FCM rotors #7 and 15, discharge orifice 80-100% open) followed by an open mill (OM) (gap distance~6 mm, roll speed 15-17 rpm, friction ratio 0.9-1.1, coolant fluid at 60° C.-90° C.). Results of vulcanizate testing for rubbers having the carbon black grade and loading shown in Table 9 are all indexed to the result for the oven-dried sample of the same composition.

TABLE 9

| CB grade and loading | N234/52 phr | | N234/59 phr | |
| --- | --- | --- | --- | --- |
| Drying Procedure | Oven dry | FCM/OM | Oven dry | FCM/OM |
| Post-dewatering mechanical energy input, MJ/kg | 0 | FCM: 1.0 OM: 0.5 | 0 | FCM: 1.0 OM: 1.0 |
| T300/T100 Index, % | 100 | 112 | 100 | 120 |
| Payne Effect index, % | 100 | 52 | 100 | 37 |
| tan $\delta_{max}$ Index, % | 100 | 83 | 100 | 87 |
| CB grade and loading | N347/52 phr | | N347/60 phr | |
| Drying Procedure | Oven dry | FCM/OM | Oven Dry | FCM/OM |
| Post-dewatering mechanical energy input, MJ/kg | 0 | FCM: 0.9 OM: 0.3 | 0 | FCM: 1.0 OM: 0.5 |
| T300/T100 Index, % | 100 | 111 | 100 | 111 |
| Payne Effect index, % | 100 | 75 | 100 | 69 |
| tan $\delta_{max}$ Index, % | 100 | 87 | 100 | 96 |
| CB grade and loading | N347/65 phr | | N326/60 phr | |
| Drying Procedure | Oven Dry | FCM/OM | Oven Dry | FCM/OM |
| Post-dewatering mechanical energy input, MJ/kg | 0 | FCM: 0.9 OM: 1.0 | 0 | FCM: 0.9 OM: 0.4 |
| T300/T100 Index, % | 100 | 112 | 100 | 111 |
| Payne Effect index, % | 100 | 64 | 100 | 63 |
| tan $\delta_{max}$ Index, % | 100 | 97 | 100 | 86 |
| CB grade and loading | N110/50 phr | | N134/50 phr | |
| Drying Procedure | Oven Dry | FCM/OM | Oven Dry | FCM/OM |
| Post-dewatering mechanical energy input, MJ/kg | 0 | FCM: 1.0 OM: 1.4 | 0 | FCM: 1.0 OM: 1.5 |
| T300/T100 Index, % | 100 | 115 | 100 | 115 |
| Payne Effect index, % | 100 | 62 | 100 | 50 |
| tan $\delta_{max}$ Index, % | 100 | 85 | 100 | 78 |

The results show that masticating masterbatch while removing water improves the mechanical performance of the resulting rubber.

Example 3

Natural rubber masterbatch was produced using the wet masterbatch process described in the Methods section with various grades and loadings of carbon black identified in Table 10. The de-watered coagulum was passed through a Farrel Continuous Mixer (FCM) under the conditions described in Example 2. Certain samples were then passed through an open mill under the conditions described in Example 2. Samples that were not put through an open mill are comparative examples. Results of vulcanizate testing for rubbers having the carbon black grades and loadings shown in Table 10 are all indexed to the result for the FCM sample of the same composition.

TABLE 10

| CB grade and loading | N234/59 phr | | CRX1346/52 phr | |
|---|---|---|---|---|
| Treatment | FCM | FCM/OM | FCM | FCM/OM |
| Post-dewatering mechanical energy input, MJ/kg | 1.0 | FCM: 1.0 OM: 1.0 | 0.9 | FCM: 0.9 OM: 0.7 |
| T300/T100 Index, % | 100 | 106 | 100 | 109 |
| Payne Effect index, % | 100 | 61 | 100 | 80 |
| tan $\delta_{max}$ Index, % | 100 | 94 | 100 | 97 |

| CB grade and loading | N134/52 phr | | N326/60 phr | |
|---|---|---|---|---|
| Treatment | FCM | FCM/OM | FCM | FCM/OM |
| Post-dewatering mechanical energy input, MJ/kg | 1.3 | FCM: 1.3 OM: 1.4 | 0.9 | FCM: 0.9 OM: 0.4 |
| T300/T100 Index, % | 100 | 106 | 100 | 106 |
| Payne Effect index, % | 100 | 89 | 100 | 88 |
| tan $\delta_{max}$ Index, % | 100 | 95 | 100 | 95 |

The results show that the additional mastication provided by the open mill imparts additional improvement to the mechanical properties of the vulcanizate beyond that provided by simply passing the material through the FCM.

Example 4

Natural rubber masterbatch containing 52 phr of N234 carbon black was produced using the wet masterbatch process described in the Methods section above. The resulting dewatered coagulum had a moisture content of 11.5%. Four rubber samples were produced from the coagulum. For the first (Example 4A), dewatered coagulum was recovered and dried for 24 hours at 60° C. For the second (Example 4B), dewatered coagulum was recovered and allowed to partially dry at room temperature in a fume hood. Both the first and second samples (Examples 4A and 4B) were masticated in a 1600 cc Banbury mixer (fill factor=0.75; ram pressure=2.8 bar; cooling water temperature=50° C.; material added at 80 rpm and masticated at 150-170 rpm and dumped at 160° C.) and then through an open mill set to 82° C. until the material was smooth. For the third (Example 4C), the de-watered coagulum was passed through a Farrel Continuous Mixer under the conditions described in Example 2. For the fourth (Example 4D), the material emerging from the FCM was further processed through an open mill as described in Example 2. The resulting material was vulcanized and the mechanical properties of the vulcanizate tested (Table 11).

TABLE 11

| Example | 4A Comparative example | 4B | 4C Comparative example | 4D |
|---|---|---|---|---|
| Initial Treatment | Oven Drying | Partial Air Drying | None | None |
| First Mastication | Banbury 1× | Banbury 2× | FCM | FCM |
| Mechanical Energy Input (MJ/kg) | 1.7 | 3.7 | 1.0 | 1.0 |
| Output Moisture Content (%) | 0.2 | 0.4 | 0.9 | 0.9 |
| Second Mastication | — | — | — | Open Mill |
| Mechanical Energy Input (MJ/kg) | | | | 0.8 |
| Output Moisture Content (%) | | | | 0.7 |
| T300/T100 | 5.6 | 6.2 | 5.7 | 6.2 |
| Payne effect (MPa) | 5.7 | 4.2 | 5.8 | 4.8 |
| Tan $\delta$max | 0.209 | 0.173 | 0.209 | 0.191 |

The performance of Sample 4B is similar to that of Sample 4D. These results show that vulcanizates prepared with mechanically masticated elastomer exhibit superior performance in comparison to vulcanizates prepared with elastomer that was thermally dried. Without being bound by any particular theory, it is thought that thermal drying causes oxidation and premature cross-linking within the elastomer composite. In addition, even after the vast majority of moisture has been removed from the dewatered coagulum, additional mastication while further removing even small amounts of moisture further improves rubber properties.

Example 5

Natural rubber masterbatch having 52 phr of N234 carbon black was produced using the wet masterbatch process described in the Methods section above and dewatered to about 16.7% moisture. Five rubber samples were produced from the resulting de-watered coagulum (Examples 5A-E). The samples were subjected to various drying and mastication processes as indicated in Table 12. Conditions for Banbury and FCM mastication were as described in Examples 1 and 2. The results of vulcanizate testing are shown in Table 12.

TABLE 12

| Example | 5A | 5B Comparative Examples | 5C | 5D | 5E |
|---|---|---|---|---|---|
| Initial Drying | Oven | | | Air dried | None |
| Water content after initial drying (%) | 1.0 | 1.0 | 1.0 | 2.2 | 16.7 |
| Initial Mastication | — | Banbury | Banbury | Banbury | FCM |
| Mechanical Energy Input (MJ/kg) | | 1.9 | 1.8 | 1.7 | 1.1 |
| Second Mastication | — | — | Banbury | Banbury | Open Mill |
| Mechanical Energy Input (MJ/kg) | | | 1.3 | 1.3 | 0.8 |
| Total Mechanical Energy Input (MJ/kg) | — | 1.9 | 3.1 | 3.0 | 1.9 |
| T300/T100 | 5.6 | 6.0 | 6.1 | 6.6 | 6.4 |
| Payne effect (MPa) | 6.7 | 4.9 | 4.1 | 3.7 | 3.8 |
| Tan $\delta$ max | 0.199 | 0.189 | 0.179 | 0.173 | 0.166 |

These results show that increasing the amount of mastication of the dewatered coagulum while removing water improves the performance of the vulcanizate.

Example 6

Natural rubber masterbatch having 50 phr of N120 carbon black was produced using the wet masterbatch process described in the Methods section above and dewatered to about 13.6% moisture. Three rubber samples were produced from the resulting coagulum (Examples 6A-C). Example 6A was partially dried at room temperature in a fume hood. Example 6B was passed through an FCM under the conditions described in Example 2 to masticate the material while reducing moisture content to about 0.5%; Example 6C was additionally passed through an open mill as described in Example 2, reducing moisture content to about 0.3. The results from vulcanizate testing are shown in Table 13.

TABLE 13

| Example | 6A Comparative Examples | 6B | 6C |
|---|---|---|---|
| Drying Process | Air dry | FCM | FCM + OM |
| First Mastication | — | FCM | FCM |
| Mechanical Energy Input (MJ/kg) | | 1.1 | 1.1 |
| Second Mastication | — | — | Open Mill |
| Mechanical Energy Input (MJ/kg) | | | 0.7 |
| Final moisture content (%) | 0.8 | 0.9 | 0.5 |
| Total Mechanical Energy Input, MJ/kg | — | 1.1 | 2.8 |
| T300/T100 | 5.6 | 5.9 | 6.3 |
| Payne effect (MPa) | 5.5 | 4.4 | 3.5 |
| Tan δmax | 0.209 | 0.194 | 0.175 |

These results show that increasing the amount of mastication of the dewatered coagulum while removing water improves the performance of the vulcanizate with respect to materials that have been masticated to a lesser extent.

Example 7

Natural rubber masterbatch was produced by the wet masterbatch process described in the Methods section using various grades of carbon black and loading levels (Table 14). A dry compounding process was also used to make rubbers of the same composition. The de-watered wet masterbatch materials were processed through an FCM and open mill under the conditions described in Example 2. Results from vulcanizate testing of the wet masterbatch compounds are shown in Table 14 alongside results from the same rubber composition produced by a dry compounding process. The ratio of the result from the wet masterbatch as a ratio to the result from the dry-mixed compound of the same composition is also given for T300/T100; the reciprocal ratio is provided for tan delta.

TABLE 14

| | | | Energy | T300/T100 | | | Tan delta (60) | | |
|---|---|---|---|---|---|---|---|---|---|
| Example | Grade | Loading (phr) | Input (MJ/kg) | Wet | Dry | Ratio (wet/dry) | Wet | Dry | Ratio (dry/wet) |
| A | N234 | 51 | 1.3 | 5.9 | 5.5 | 1.08 | 0.192 | 0.195 | 1.02 |
| B | N234 | 52 | 1.3 | 6.2 | 5.4 | 1.14 | 0.196 | 0.204 | 1.04 |
| C | N234 | 52 | 1.4 | 6.2 | 5.4 | 1.14 | 0.169 | 0.190 | 1.12 |
| D | N234 | 52 | 1.3 | 6.2 | 5.4 | 1.15 | 0.181 | 0.203 | 1.12 |
| E | N234 | 52 | 1.3 | 6.3 | 5.5 | 1.14 | 0.186 | 0.198 | 1.06 |
| F | N234 | 52 | 1.4 | 6.1 | 5.4 | 1.13 | 0.214 | 0.211 | 0.99 |
| G | N234 | 59 | 1.4 | 5.7 | 5.6 | 1.02 | 0.23 | 0.232 | 1.01 |
| H | N234 | 52 | 1.3 | 6.5 | 5.5 | 1.17 | 0.175 | 0.191 | 1.09 |
| I | N234 | 52 | 1.5 | 6.2 | 5.7 | 1.08 | 0.181 | 0.201 | 1.11 |
| J | N234 | 59 | | 6.3 | 5.0 | 1.25 | 0.201 | 0.204 | 1.01 |
| K | N347 | 52 | | 6.2 | 5.2 | 1.19 | 0.135 | 0.162 | 1.20 |
| L | N347 | 60 | | 5.6 | 4.6 | 1.19 | 0.167 | 0.188 | 1.13 |
| M | N347 | 65 | | 5.1 | 4.4 | 1.16 | 0.186 | 0.201 | 1.08 |
| N | N120 | 40 | | 5.9 | 5.4 | 1.09 | 0.129 | 0.137 | 1.07 |
| O | N120 | 50 | 1.5 | 6.2 | 5.4 | 1.16 | 0.175 | 0.185 | 1.06 |

The results show that the combination of properties indicated by higher T300/T100 and lower tan δ is generally substantially better for wet masterbatch materials produced using appropriate mechanical energy during drying than for dry-mixed compounds of the same composition.

Example 8

Natural rubber masterbatch was produced by the wet masterbatch process described in the Methods section using various grades of carbon black and loading levels (Table 15). A dry compounding process was also used to make rubbers of the same composition. The de-watered wet masterbatch materials were processed through an FCM and open mill under the conditions described in Table 15, below. Results from vulcanizate testing of the wet masterbatch compounds are shown in Table 16 alongside results from the same rubber composition produced by a dry compounding process. The ratio of the result from the vulcanized wet mix composite as a ratio to the result from the vulcanized dry mix composite of the same composition is also given for T300/T100; the reciprocal ratio is provided for tan delta.

TABLE 15

| Grade | Loading | Production rate (kg/h) | FCM Power (kW) | FCM rpm | Roll mill speed (rpm) | Roll mill temp (C.) |
|---|---|---|---|---|---|---|
| BP880 | 50 | 252 | 57 | 210 | 16 | 50 |
| BP880 | 45 | 303 | 97 | 220 | 17 | 76 |
| CRX1490 | 50 | 265 | 70 | 191 | 16 | 60 |
| CRX1490 | 42 | 258 | 62 | 186 | 16 | 74 |

TABLE 16

| | | T300/T100 | | | Tan delta (60) | | |
|---|---|---|---|---|---|---|---|
| Grade | Loading (phr) | Wet | Dry | Ratio (wet/dry) | Wet | Dry | Ratio (dry/wet) |
| BP880 | 50 | 6.1 | 5.5 | 1.11 | 0.247 | 0.232 | 0.94 |
| BP880 | 45 | 5.6 | 5.3 | 1.06 | 0.215 | 0.206 | 0.96 |

TABLE 16-continued

| Grade | Loading (phr) | T300/T100 Wet | T300/T100 Dry | Ratio (wet/dry) | Tan delta (60) Wet | Tan delta (60) Dry | Ratio (dry/wet) |
|---|---|---|---|---|---|---|---|
| CRX1490 | 50 | 6.5 | 5.7 | 1.14 | 0.220 | 0.201 | 0.91 |
| CRX1490 | 42 | 6.0 | 5.6 | 1.07 | 0.185 | 0.166 | 0.90 |

The results show that, even for higher surface area carbon blacks (CRX 1490 STSA=174 $m^2/g$ and BP880 STSA=197 $m^2/g$), the resulting compounds demonstrate improved reinforcement (as shown by T300/T100) with respect to dry mix.

Example 9

Comparative Example—Single Mastication Step

Natural rubber masterbatch prepared with field latex and N120 carbon black was produced using the wet masterbatch process described in the Methods section. The amount of carbon black in the rubber and the operating conditions of the coagulum reactor and FCM are indicated in Table 17. In contrast, for example, to Examples N and O in Table 14, the samples were not further masticated to remove water following mastication in the FCM. The results of vulcanizate testing are shown in Table 17.

TABLE 17

| | Processing Stage | | | | | | |
|---|---|---|---|---|---|---|---|
| | FCM | FCM | FCM | FCM | FCM | FCM | FCM |
| | | | | target CB loading | | | |
| | 50 phr | 50 phr | 60 phr | 60 phr | 60 phr | 60 phr | 53 phr |
| Production Rate, kg/hr | 500 | 500 | 700 | 700 | 500 | 500 | 740 |
| FCM rpm | 310 | 270 | 400 | 350 | 310 | 240 | 400 |
| FCM temp, °C. | 155 | 121 | 132 | 152 | 170 | 130 | 130 |
| Mechanical Energy Input (MJ/kg) | 1.1 | 0.6 | 0.7 | 0.6 | 0.9 | 0.6 | 0.5 |
| Final moisture content, % | 1.7 | 2.9 | 1.1 | 1.6 | 1.6 | 1.3 | 2.4 |
| T300/T100 | 5.4 | 4.9 | 5.4 | 5.5 | 5.9 | 5.3 | 5.5 |
| tan $\delta_{max}$ | 0.206 | 0.193 | 0.247 | 0.251 | 0.245 | 0.244 | 0.216 |
| Payne effect, (MPa) | 8.4 | 6.7 | 11.8 | 12.6 | 11.1 | 12.9 | 7.4 |

The results show that variation of the production conditions, including the production rate, the rate of rotation of the rotors in the FCM, and the operating temperature, influence the performance of the vulcanized rubber product. Further improvement in rubber properties may be had by further masticating the material while removing water.

Example 10

Natural rubber masterbatch having 55 phr of N234 carbon black was produced using the wet masterbatch process described in the Methods section. A dewatering extruder (French Oil Mill Machinery Company, Piqua, Ohio) was employed to bring the masterbatch crumb to between 1 and 3% moisture. The dewatered coagulum was fed directly to an open mill with a small amount of antioxidant and sheeted off the open mill when a smooth surface appeared. The ratio of T300/T100 for the resulting vulcanizate was about 6, comparable to that for materials prepared using an FCM or a Banbury mixer prior to open milling, indicating that rubber having desirable properties may be produced regardless of the method of mastication. Further mastication through one Banbury cycle as described above was detrimental to certain rubber properties, reducing both $T_{300}/T_{100}$ and tan delta, indicating that excessive mastication can be detrimental to rubber properties.

Example 11

Electrical Resistivity Testing

Natural rubber masterbatch was produced by the wet masterbatch process described in the Methods section using various grades of carbon black and loading levels (Table 18). The de-watered wet masterbatch materials were processed through an FCM and open mill under the conditions described in Example 2. The resulting masticated coagulum was processed using CTV Method A. Vulcanized dry mix elastomer composites of varying compositions (Table 19) were prepared according to CTV Comparative Method A.

TABLE 18

Grades and Loading of Wet Masterbatch Samples

| Grade | Loading (phr) |
|---|---|
| CRX1346 | 41.22 |
| CRX1346 | 60.69 |

TABLE 18-continued

Grades and Loading of Wet Masterbatch Samples

| Grade | Loading (phr) |
|---|---|
| CXG100 | 32.49 |
| CXG100 | 45.11 |
| N134 | 49.63 |
| N134 | 60.61 |
| N234 | 31.09 |
| N234 | 32.14 |
| N234 | 33.01 |
| N234 | 33.41 |
| N234 | 50.2 |
| N234 | 50.3 |
| N234 | 33.48 |
| N234 | 33.53 |
| N234 | 34.05 |
| N234 | 34.84 |
| N234 | 34.85 |
| N234 | 35.63 |
| N234 | 48 |
| N234 | 49.2 |

TABLE 18-continued

Grades and Loading of Wet Masterbatch Samples

| Grade | Loading (phr) |
|---|---|
| N234 | 49.5 |
| N234 | 49.6 |
| N234 | 49.7 |
| N234 | 49.9 |
| N234 | 50.3 |
| N234 | 50.3 |
| N234 | 50.4 |
| N234 | 50.78 |
| N234 | 51.1 |
| N234 | 51.4 |
| N234 | 52.8 |
| N234 | 53 |
| N234 | 53.2 |
| N234 | 57.7 |
| N234 | 57.9 |
| N234 | 58.06 |
| N234 | 64.6 |
| N234 | 64.9 |

TABLE 19

Grades and Loading of Dry Mixed (Comparative) Samples

| Grade | Loading (phr) |
|---|---|
| CRX1346 | 55 |
| CRX1346 | 63 |
| CXG100 | 55 |
| CXG100 | 65 |
| N134 | 45 |
| N134 | 65 |
| N234 | 35 |
| N234 | 48 |
| N234 | 51 |
| N234 | 53 |
| N234 | 58 |
| N234 | 65 |

Figure 3:
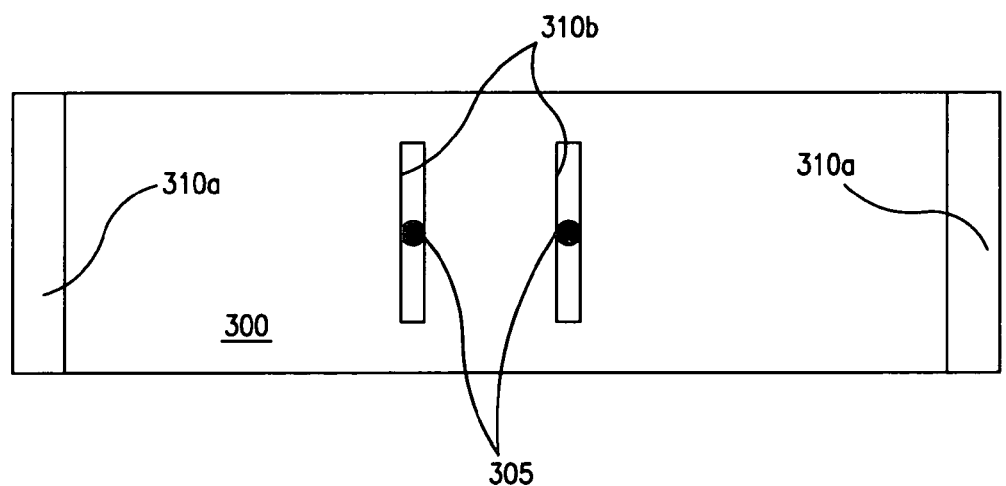
FIG. 3 is a schematic diagram illustrating the configuration of samples for electrical resistivity testing.

After curing the sheets produced from both wet masterbatch materials and dry mixed materials were rested for at least 24 hours. FIG. 3 shows the configuration of samples for electrical testing. Sheets 300 measuring 150 mm by 70 mm were measured at four points close to the points 305 for electrical contact. Both surfaces of the sample were cleaned by wiping with isopropyl alcohol, following which the sample was only handled with gloves. Silver paint was applied to both ends 310a of the sample and as two strips 310b near the center of the sample. A template was used to apply the center strips 310b of conductive paint. After the paint dried, the template was removed. The prepared sample was placed on a flat, non-conductive base, and current supply electrodes were attached by metal bars at each end of the sheet. Gold electrodes were lowered onto the center paint strips with their closest edges spaced exactly 10 mm apart using a spring-loaded device that applied constant load. These were used for voltage measurement. A signal generator was used to apply pulses of 50 ms duration, with a gap of 50 ms between pulses. The direction of the current was reversed for each pulse. The current was increased for each successive pulse and the voltage measured each time. The initial current and size of the current increments were chosen such that at least 50 data points were obtained over an output range of 0-10 V. The results were first checked to ensure that voltage was proportional to current. The resistance was then obtained from a linear regression of a plot of voltage against current. The measured resistance was converted to resistivity by multiplying it by the average sample thickness and dividing the result by the distance between the center electrodes (10 mm). All compounds were tested in triplicate, and the average result was used.

Figure 4:
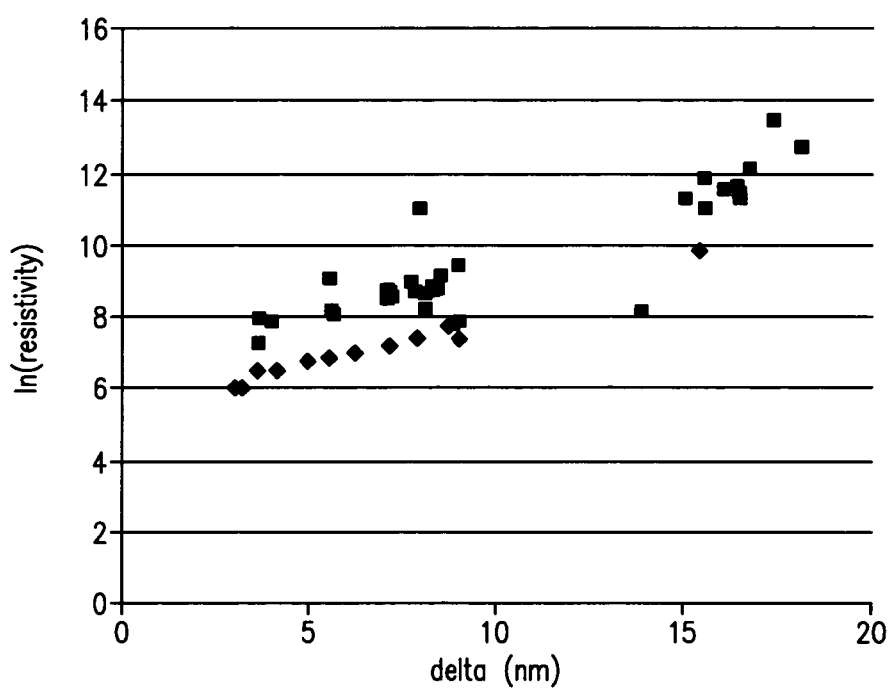
FIG. 4 is a graph of the natural log of resistivity with respect to Delta comparing vulcanized elastomer composites produced according to an exemplary embodiment of the invention (squares) and produced according to a dry mixing method (diamonds)

FIG. 4 is a graph of the natural log of the resistivity with respect to Delta (see Eqn. 1). The graph shows that the resistivity of dry mixed samples is well correlated with the morphology and loading of the filler as represented by Delta. In addition, the resistivity of samples prepared according to an embodiment of the invention is generally higher than that of dry mixed samples. The increase in sample resistivity with respect to Delta shown on the graph shows that the separation of individual carbon black aggregates is not as pronounced at higher values of Delta. Delta is directly related to structure and inversely related to loading and surface area; variation in any one or more of these variables can contribute to the change in rubber resistivity.

Example 12

Ultra-Small Angle Neutron Scattering (USANS)

Natural rubber masterbatch was produced by a wet masterbatch process as described in the Methods section using various grades of carbon black and loading levels (Table 20). The de-watered wet masterbatch materials were processed through an FCM and open mill under the conditions described in Example 2. The resulting masticated coagulum was processed according to CTV Method B to produce a vulcanizate.

A dry compounding process as described in Table 18 was also used to make rubbers of varying compositions using the formulation in Table 21. After each Banbury mixing stage, compounds were sheeted on a 2-roll mill using 4 cross-cuts and 2 end-rolls. The rest time between stage 1 and stage 2 mixing was typically 4-6 hours. Compounds were then cured in a press at 150° C. using a mold with a 1 mm thick spacer for a time determined by a conventional rubber rheometer (i.e., T90+10% of T90).

TABLE 20

| | Loading (phr) | |
|---|---|---|
| Grade | Wet MB | Comparative Examples |
| CRX1346 | 55 | 55 |
| CXG100 | 54.2 | 54 |
| N115 | 44.6 | 45 |
| N134 | 50.6 | 50 |
| N234 | 47.7 | 48 |
| N234 | 35.9 | 35.75 |
| N234 | 40.3 | 39.34 |
| N234 | 51.74 | 49.86 |
| N347 | 54.7 | 55 |

TABLE 21

| | Parts by weight |
|---|---|
| Natural Rubber | 100 |
| Carbon black | Variable |
| Perkadox PD-50S-ps | 7 |
| 6-PPD | 1.5 |

USANS measurements were performed using the perfect crystal diffractometer available at beam line BT5, NIST Center for Neutron Research, Gaithersburg Md. Scattering data were collected using neutrons of 2 Å wavelength in the range $3\times10^{-5}$ Å$^{-1}$≤Q≤$5\times10^{-4}$ Å$^{-1}$. The uncertainty in the measured wave vector along the vertical axis is $\Delta Q_v \approx \pm 0.117$ Å$^{-1}$. USANS data were corrected ("desmeared") for aberrations introduced to the data by the instrument and reduced into absolute intensity units according to the procedure outlined in Kline, *J. Appl. Cryst.*, 2006, 39, 895-900, using the software package provided by the NIST Center for Neutron Research at their website, http://www.ncnr.nist.gov/programs/sans/data/red_anal.html. The Neutron Scattering Power Value P was calculated according to Equation 3. The neutron scattering contrast factor $(b_{medium}-b_{CB})^2$ was taken as $3.29*10^{21}$ cm$^{-4}$.

Figure 5:
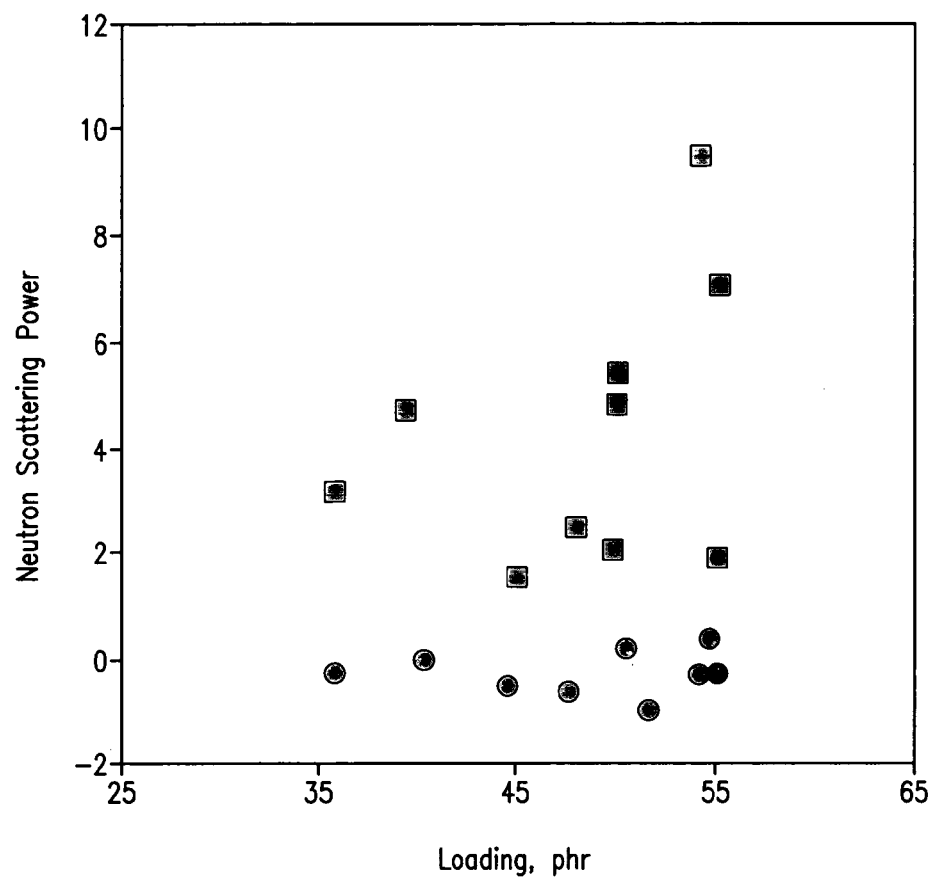
FIG. 5 is a graph of the Neutron Scattering Power Value with respect to filler loading comparing vulcanized elastomer composites produced according to an exemplary embodiment of the invention (circles) and produced according to a dry mixing method (squares)

FIG. 5 shows a plot of Neutron Scattering Power Value with respect to loading for composites prepared according to the invention and for dry mixed composites. The figure shows that, for materials prepared according to exemplary embodiments of the invention, Neutron Scattering Power Value is relatively uncorrelated with loading and carbon black morphology for the carbon blacks and loading levels used. In contrast, the Neutron Scattering Power Value from dry mixed materials is significantly higher and varies widely with loading and filler morphology.

Example 13

Ultra-Small Angle Neutron Scattering

Four samples of natural rubber masterbatch incorporating 50 phr of N234 carbon black were produced by a wet masterbatch process as described in the Methods section. The dewatered coagulum was processed through an FCM under the conditions described in Example 2. Two samples were processed at a production rate of 350 kg/hr (indicated by squares in FIG. 6) and two at a production rate of 550 kg/hr (indicated by triangles in FIG. 6). One sample from each of these pairs (e.g., one sample produced at each production rate) was processed through an open mill as described in Example 2; the second, comparative sample was used as discharged from the FCM. The resulting four samples of masticated coagulum were cured according to CTV Method A, except that a 1 mm thick spacer was employed in the press.

Figure 6:
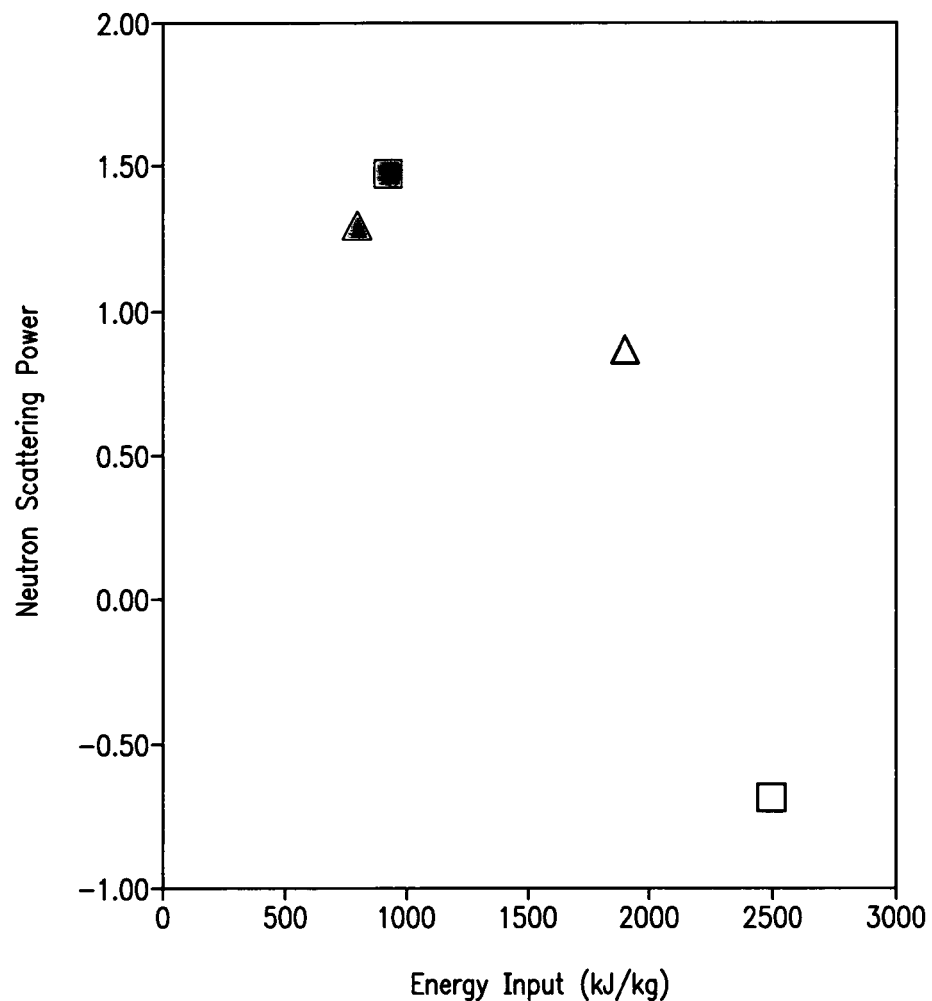
FIG. 6 is graph of the Neutron Scattering Power Value with respect to energy input comparing vulcanized wet mix elastomer composites processed using various operating conditions for mechanical mastication following coagulation (triangles: 550 kg/hr; squares: 350 kg/hr; closed symbols: FCM only; open symbols: FCM+open mill).

USANS was performed on all four of these samples according to the procedure described in Example 12 except that the neutron scattering contrast factor $(b_{medium}-b_{CB})^2$ was taken as $3.242*10^{21}$ cm$^{-4}$ to account for the use of zinc and sulfur in the cure package. FIG. 6 shows a plot of Neutron Scattering Power Value with respect to energy input for all four samples. The results show that, even when zinc is present in the vulcanizate, that neutron scattering can be used to analyze the dispersion of carbon black in the composite. The four samples were also analyzed using the electrical resistivity measurement described in Example 11; similar results were observed (Table 22). Furthermore, the results show that differences in processing conditions result in variations in microdispersion. That is, varying the processing conditions changes the degree of dispersion of carbon black within the composite. Furthermore, the use of a second mastication step, accompanied by the removal of moisture from the masticated coagulum, provides a dramatic improvement in carbon black dispersion.

TABLE 22

| Drying Procedure | Production Rate (kg/h) | Energy FCM (MJ/kg) | Energy OM (MJ/kg) | Total Energy Input (MJ/kg) | Electrical Resistivity (ohm-cm) | Scattering Power |
|---|---|---|---|---|---|---|
| FCM | 350 | 900 | — | 900 | 5735 | 1.48 |
| FCM + OM | 350 | 900 | 1600 | 2500 | 19468 | −0.69 |
| FCM | 550 | 775 | — | 775 | 6797 | 1.30 |
| FCM + OM | 550 | 775 | 1110 | 1885 | 12699 | 0.87 |

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vulcanized wet mix elastomer composite comprising a particulate filler, the particulate filler comprising at least one carbon black having a CDBP value of at least about 65 mL/100 g, wherein the vulcanized wet mix elastomer composite exhibits a ratio of T300 to T100 that is more than 20% greater than the same ratio for a vulcanized dry mix elastomer composite having the same composition.

2. The vulcanized wet mix elastomer composite of claim 1, wherein the at least one carbon black has a CDBP value of at least about 70 mL/100 g.

3. A wet mix elastomer composite consisting essentially of carbon black dispersed in natural rubber, wherein, when the elastomer composite is processed with CTV Method A to form a vulcanized wet mix elastomer composite, the resulting vulcanized wet mix elastomer composite exhibits a resistivity having a natural logarithm that is at least about 10% higher than the same property for a vulcanized dry mix elastomer composite having the same composition and prepared using CTV Comparative Method A.

4. The wet mix elastomer composite of claim 3, wherein the natural logarithm of the resistivity of the vulcanized wet mix elastomer composite is at least about 15% greater than the same property for a vulcanized dry mix elastomer composite having the same composition and prepared using CTV Comparative Method A.

5. A wet mix elastomer composite comprising carbon black dispersed in natural rubber, wherein, when the elastomer composite is processed using CTV Method B, it exhibits a Neutron Scattering Power Value less than about 0.5.

6. The elastomer composite of claim 5, wherein the Neutron Scattering Power Value is less than about 0.

7. The elastomer composite of claim 5, wherein the Neutron Scattering Power Value is less than about −0.25.

* * * * *